(12) United States Patent
Welker

(10) Patent No.: US 8,483,008 B2
(45) Date of Patent: Jul. 9, 2013

(54) COIL SHOOTING MODE

(75) Inventor: Kenneth E. Welker, Nesoya (NO)

(73) Assignee: WesternGeco L.L.C., Houston, TX (US)

( * ) Notice: Subject to any disclaimer, the term of this patent is extended or adjusted under 35 U.S.C. 154(b) by 291 days.

(21) Appl. No.: 12/267,561

(22) Filed: Nov. 8, 2008

(65) Prior Publication Data

US 2010/0118645 A1 May 13, 2010

(51) Int. Cl.
*G01V 1/38* (2006.01)
*G05B 13/02* (2006.01)

(52) U.S. Cl.
USPC .................... 367/17; 367/19; 367/20; 700/30

(58) Field of Classification Search
USPC ................. 367/15–17, 19
See application file for complete search history.

(56) References Cited

U.S. PATENT DOCUMENTS

| | | |
|---|---|---|
| 2,693,862 A | 11/1954 | Rieber |
| 2,823,375 A | 2/1958 | Camp |
| 3,283,293 A | 11/1966 | Pavey et al. |
| 3,331,050 A | 7/1967 | Kilmer et al. |
| 3,506,674 A | 4/1970 | Berger |
| 3,560,912 A | 2/1971 | Spink et al. |
| 3,605,674 A | 9/1971 | Weese |
| 3,774,570 A | 11/1973 | Pearson |
| 3,806,863 A | 4/1974 | Tilley et al. |
| 3,921,124 A | 11/1975 | Payton |
| 3,934,220 A | 1/1976 | Davis |
| 4,146,870 A | 3/1979 | Ruehle |
| 4,231,111 A | 10/1980 | Neeley |
| 4,404,664 A | 9/1983 | Zachariadis |
| 4,468,663 A | 8/1984 | Kalt |
| 4,486,863 A | 12/1984 | French |
| 4,648,080 A | 3/1987 | Hargreaves |
| 4,669,097 A | 5/1987 | Bristol |
| 4,757,482 A | 7/1988 | Fiske, Jr. |
| 4,803,668 A | 2/1989 | Berryhill et al. |
| 4,834,181 A | 5/1989 | Uhri et al. |
| 4,942,991 A | 7/1990 | Lyons |
| 4,960,183 A | 10/1990 | Young, II |
| 4,965,773 A | 10/1990 | Marschall |
| 4,970,696 A | 11/1990 | Crews et al. |
| 4,970,697 A | 11/1990 | Earley et al. |
| 4,992,990 A | 2/1991 | Langeland et al. |

(Continued)

FOREIGN PATENT DOCUMENTS

| | | |
|---|---|---|
| EP | 0 321705 A2 | 6/1989 |
| EP | 0 347019 A2 | 12/1989 |

(Continued)

OTHER PUBLICATIONS

Bacon et al., 3-D Seismic Interpretation, Cambridge University Press, 2003, pp. 18-22.*

(Continued)

*Primary Examiner* — Isam Alsomiri
*Assistant Examiner* — Daniel L Murphy

(57) ABSTRACT

The technique disclosed herein includes a method and apparatus for controlling streamer steering devices to maintain a coil streamer shape that gives coverage for a coil shooting plan. The technique uses solved positions and a target coil streamer shape identified in the shooting plan to determine steering instructions to the streamer steering devices along the streamer.

30 Claims, 6 Drawing Sheets

U.S. PATENT DOCUMENTS

| | | | |
|---|---|---|---|
| 4,992,991 | A | 2/1991 | Young et al. |
| 5,300,929 | A | 4/1994 | MacLeod |
| 5,353,223 | A | 10/1994 | Norton et al. |
| 5,430,689 | A | 7/1995 | Rigsby et al. |
| 5,443,027 | A | 8/1995 | Owsley et al. |
| H001490 | H | 9/1995 | Thompson et al. |
| 5,508,973 | A | 4/1996 | Mallick et al. |
| 5,555,531 | A | 9/1996 | Booth et al. |
| 5,668,775 | A | 9/1997 | Hatteland |
| 5,677,893 | A | 10/1997 | de Hoop et al. |
| 5,761,152 | A | 6/1998 | Jacobsen et al. |
| 5,973,995 | A | 10/1999 | Walker et al. |
| 6,044,040 | A | 3/2000 | Holland |
| 6,061,301 | A | 5/2000 | Corrigan |
| 6,175,809 | B1 | 1/2001 | Naville |
| 6,178,381 | B1 | 1/2001 | Padhi et al. |
| 6,285,956 | B1 | 9/2001 | Bennett et al. |
| 6,292,754 | B1 | 9/2001 | Thomsen |
| 6,343,256 | B1 | 1/2002 | Winbow et al. |
| 6,477,111 | B1 | 11/2002 | Lunde et al. |
| 6,525,992 | B1 | 2/2003 | Olivier et al. |
| 6,529,832 | B1 | 3/2003 | Kerekes |
| 6,553,315 | B2 | 4/2003 | Kerekes et al. |
| 6,590,831 | B1 | 7/2003 | Bennett et al. |
| 6,671,223 | B2 | 12/2003 | Bittleston |
| 6,684,160 | B1 | 1/2004 | Ozbek et al. |
| 6,691,038 | B2 | 2/2004 | Zajac |
| 6,714,873 | B2 | 3/2004 | Bakulin et al. |
| 6,837,175 | B1 | 1/2005 | Gieseke |
| 6,847,896 | B1 | 1/2005 | Orban et al. |
| 6,862,531 | B2 | 3/2005 | Horne et al. |
| 6,865,487 | B2 | 3/2005 | Charron |
| 6,932,017 | B1 | 8/2005 | Hillesund et al. |
| 6,944,094 | B1 | 9/2005 | Thomsen et al. |
| 7,065,449 | B2 | 6/2006 | Brewster et al. |
| 7,080,607 | B2 | 7/2006 | Hillesund et al. |
| 7,203,130 | B1 | 4/2007 | Welker |
| 7,239,577 | B2 | 7/2007 | Tenghamn et al. |
| 7,293,520 | B2 | 11/2007 | Hillesund et al. |
| 7,377,224 | B2 | 5/2008 | Ryan et al. |
| 7,391,673 | B2 | 6/2008 | Regone et al. |
| 7,400,552 | B2 | 7/2008 | Moldoveanu et al. |
| 7,403,448 | B2 | 7/2008 | Welker et al. |
| 7,679,990 | B2 | 3/2010 | Herkenhoff et al. |
| 7,952,522 | B2 | 5/2011 | Hohl |
| 7,965,583 | B2 | 6/2011 | Thomas |
| 2002/0193947 | A1 | 12/2002 | Chamberlain |
| 2003/0067842 | A1 | 4/2003 | Sukup et al. |
| 2003/0125878 | A1 | 7/2003 | Bakulin et al. |
| 2004/0042341 | A1 | 3/2004 | Tenghamn et al. |
| 2004/0066707 | A1 | 4/2004 | Tenghamn et al. |
| 2004/0125697 | A1 | 7/2004 | Fleming |
| 2004/0240319 | A1 | 12/2004 | Carvill et al. |
| 2005/0018537 | A1 | 1/2005 | Welker et al. |
| 2005/0180260 | A1 | 8/2005 | Planke et al. |
| 2005/0180263 | A1 | 8/2005 | Lambert et al. |
| 2005/0194201 | A1 | 9/2005 | Tenghamn et al. |
| 2006/0215489 | A1 | 9/2006 | Solheim et al. |
| 2006/0227657 | A1 | 10/2006 | Tveide et al. |
| 2006/0239117 | A1 | 10/2006 | Singh et al. |
| 2006/0256653 | A1 | 11/2006 | Toennessen et al. |
| 2006/0256654 | A1 | 11/2006 | Paulsen |
| 2006/0285435 | A1 | 12/2006 | Robertsson |
| 2007/0064526 | A1 | 3/2007 | Holo |
| 2007/0104028 | A1 | 5/2007 | Van Manen et al. |
| 2007/0127312 | A1* | 6/2007 | Storteig et al. ................. 367/15 |
| 2007/0159921 | A1 | 7/2007 | Regone et al. |
| 2007/0165486 | A1* | 7/2007 | Moldoveanu et al. .......... 367/15 |
| 2007/0274153 | A1 | 11/2007 | Bisley et al. |
| 2008/0267010 | A1 | 10/2008 | Moldoveau et al. |
| 2008/0285380 | A1 | 11/2008 | Rouquette |
| 2008/0285381 | A1 | 11/2008 | Moldoveanu et al. |
| 2009/0122640 | A1 | 5/2009 | Hill et al. |
| 2009/0245019 | A1 | 10/2009 | Falkenberg et al. |
| 2009/0262601 | A1 | 10/2009 | Hillesund et al. |
| 2009/0310439 | A1 | 12/2009 | Hauan et al. |
| 2009/0310440 | A1 | 12/2009 | Solheim et al. |
| 2009/0316525 | A1 | 12/2009 | Welker |
| 2010/0013485 | A1 | 1/2010 | Alumbaugh et al. |
| 2010/0027374 | A1 | 2/2010 | Moldoveanu et al. |
| 2010/0142317 | A1 | 6/2010 | Moldoveanu et al. |
| 2010/0238762 | A1* | 9/2010 | Hornbostel ..................... 367/17 |
| 2011/0158041 | A1 | 6/2011 | Moldoveanu et al. |
| 2011/0158042 | A1 | 6/2011 | Moldoveanu et al. |

FOREIGN PATENT DOCUMENTS

| | | | |
|---|---|---|---|
| EP | 0 613 025 | A1 | 8/1994 |
| EP | 0 613 025 | B1 | 8/1994 |
| EP | 0613025 | A1 | 8/1994 |
| EP | 0 681193 | B1 | 8/1999 |
| GB | 2144854 | A | 3/1985 |
| GB | 2342081 | A | 4/2000 |
| GB | 2390902 | A | 1/2004 |
| GB | 2436206 | A | 9/2007 |
| WO | WO 8403153 | A1 | 8/1984 |
| WO | WO 96/21163 | A1 | 7/1996 |
| WO | WO 9828636 | A1 | 7/1998 |
| WO | WO 0020895 | A1 | 4/2000 |
| WO | WO 0129580 | A1 | 4/2001 |
| WO | 2004092771 | A2 | 10/2004 |
| WO | 2005062075 | A1 | 7/2005 |
| WO | 2006014750 | A2 | 2/2006 |
| WO | 2007070499 | A2 | 6/2007 |

OTHER PUBLICATIONS

Cole and French, "A circular seismic acquisition technique for marine three dimensional surveys," *Offshore Technology Conference*, 4864, Houston, Texas, May 6-9, 1985.

Sukup, "Wide Azimuth marine qcquisition by the Helix method," The Leading Edge, pp. 791-794, Aug. 2002.

WesternGeco, Q-Technology, URL: http://www.westerngeco.com/content/services/q_technology/index.asp, 2006.

PCT Search Report, dated Apr. 30, 2010, Application No. PCT/US2009/063538.

Moldoveanu, et al; Full Azimuth Imaging Using Circular Geometry Acquisition; Leading Edge; vol. 27, No. 7; pp. 908-913; Jul. 2008.

PCT Search Report and Written Opinion; PCT/US2009/031396; May 14. 2009.

IPAU Examination Report (Jun. 21, 2012); AU 2008254856.

SIPO Rejection Decision (Jun. 6, 2012) and SIPO Office Actions (Feb. 6, 2012 and Jul. 20, 2011); CN 200880021257.8.

Mexican associate reportings dated 2012 Jul, Oct. 2011, and Apr. 2011 for IMPI Office Actions; MX/a/2009/012362.

UKIPO Examination Reports (May 18, 2012 and Feb. 13, 2012); GB 1019199.7.

Mexican associate reportings dated Aug. 2012 and Mar. 2012 for IMPI Office Actions; MX/a/2010/013018.

IPAU Examination Report (May 16, 2008); AU 2006252148.

SIPO Office Action (Nov. 19, 2010); CN 200710003980.0.

UKIPO Examination Reports (Jun. 8, 2010, Mar. 17, 2010, Nov. 13, 2009, Aug. 10, 2009 and Feb. 6, 2009) and UKIPO Search Report (Jul. 18, 2007); GB 0700970.9.

Mexican associate reporting dated Jun. 2009 for IMPI Office Action; PA/a/2007/000733.

Beasley, et al.; A New Look at Simultaneous Sources; SEG Expanded Abstracts; 1998.

Moldoveanu; "Circular Geometry for Wide-Azimuth Towed-Streamer Acquisition"; EAGE; Jun. 2008.

Hennenfent, et al.; "Simply Denoise: Wavefield Reconstructions via Jittered Undersampling"; Geophysics; vol. 73(2); pp. v19-v28; May-Jun. 2008.

Hennenfent, et al.; "Random Sampling: New Insights into the Reconstruction of Coarsely-Sampled Wavefields"; SEG Annual Meeting; pp. 2575-2579; Oct. 2007.

Bacon, et al.; "3-D Seismic Interpretation"; Cambridge University Press; pp. 18-22 and 25-26; 2003.

Pan; "Single-Sensor Towed Streamer Improves Seismic Acquisition"; Offshore; Apr. 2002.

Wong, et al.; "Sampling with Hammersley and Halton Points"; 2 Journal of Graphics Tools; pp. 9-24; 1997.

Reilly, et al; "Concentric Circle 3D: Optimization of Salt Diapir Flank Imaging UK Central North Sea"; First Break; vol. 12, No. 9; pp. 463-475; Sep. 1994.

PCT Search Report and Written Opinion; PCT/US2010/062419; Sep. 26, 2011.

PCT Search Report and Written Opinion; PCT/US2010/035063; Dec. 29, 2010.

PCT Search Report and Written Opinion; PCT/US2009/060864; May 1, 2010.

PCT Search Report and Written Opinion; PCT/US2009/047015; Feb. 24, 2010.

PCT Search Report and Written Opinion; PCT/US2009/047019; Jan. 7, 2010

PCT Search Report and Written Opinion; PCT/US2009/045261; Dec. 23, 2009.

PCT Search Report and Written Opinion; PCT/US2008/063875; Sep. 16, 2009.

UKIPO examination report (Aug. 10, 2009) and search report (Aug. 7, 2009) for GB 0912870.3.

* cited by examiner

COIL SHOOTING MODE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention pertains to towed-array marine seismic surveys, and, more particularly, to towed-array marine seismic surveys employing generally advancing curved sail lines, also known as a "coil shoot".

2. Description of the Related Art

This section of this document is intended to introduce various aspects of the art that may be related to various aspects of the present invention described and/or claimed below. This section provides background information to facilitate a better understanding of the various aspects of the present invention. As the section's title implies, this is a discussion of related art. That such art is related in no way implies that it is also prior art. The related art may or may not be prior art. It should therefore be understood that the statements in this section of this document are to be read in this light, and not as admissions of prior art.

The exercise of examining subterranean geological formations for hydrocarbon deposits is known as "seismic surveying". Sometimes the geological formations lie beneath a body of water. This type of seismic survey is known as a "marine" seismic survey. Marine seismic surveys may be performed in salt, fresh, or brackish waters and are not limited to saltwater environments.

One type of marine seismic survey is called a "towed-array" seismic survey. In such a survey, a survey vessel tows an array of equipment along a straight sail line. The array usually includes a number of seismic streamers, typically up to eight, that can be several kilometers long. The streamers are populated with a number of instruments, most notably seismic receivers such as hydrophones. Sometimes the array will also include a plurality of seismic sources. As the array is towed along the straight sail line, the streamers ideally straighten and roughly parallel each other.

Sometimes environmental or survey conditions adversely impact the shape of the array. Arrays therefore typically include a number of steering devices. Steering devices are typically included on various parts of the array and, in particular, the streamers. Streamer steering devices such as the WesternGeco Q-FIN™ operate with a global system controller that has an overall view of the streamer shape to determine the steering device instructions. Without such a global controller to coordinate the efforts of each individual steering device, the system would be unable to achieve any meaningful steering objectives.

Steering objectives that have been achieved by the WesternGeco global controller include a fan mode, a constant separation mode, and a demanded feather mode. In the fan mode, the streamers are spread relative to each other to avoid collision and tangling. In the constant separation mode, streamer separation is equal from front to tail of the streamer spread, overcoming the so-called trouser effect that results from vessel wake and causes uneven streamer separations towards the spread center. In the demanded feather mode, the streamers have a specified "feather". This mode is especially useful for so-called 4D surveys, but it is also useful for coverage with respect to the feather along the adjacent line.

The global controller for the spread steering elements in general, and the streamer steering devices in particular, that implement these modes use knowledge of the relative position of those steering elements they must coordinate with to obtain the geophysical or operational safety objective the mode is targeting. The controller possesses communication and processing capabilities to make the necessary steering decisions in a timely manner.

The controller's role places some constraints on its location. For example, a local controller located in the steering device must have a global or at least a subset of the global coordinates of the steering devices it is coordinating with available to it in a time period that allows a steering action that is a reaction to recent positions. A more general solution is to locate a global controller on the towing vessel and design the system to deliver steering instructions based on the global two-dimensional or three-dimensional coordinates of the relevant points in the spread.

Today, a new type of towed-array marine seismic survey is being developed known as a "coil shoot". In a coil shoot, the array is towed on a generally advancing, curved path rather than a straight line. When shooting a coil survey, the streamers are changing their orientation with respect to any local ocean or sea current as they traverse through the coil or curved path. This causes the streamers to drift away from the desired positions if one of the conventional steering modes is in use as these modes are not designed to maintain a curve shape. Instead the streamers may attempt to keep constant separation or feather angle no matter what the streamer shape.

The present invention is directed to resolving, or at least reducing, one or all of the problems mentioned above.

SUMMARY OF THE INVENTION

The technique disclosed herein includes a method and apparatus for controlling streamer steering devices to maintain a coil streamer shape that gives coverage for a coil shooting plan. The technique uses solved positions and a target coil streamer shape identified in the shooting plan to determine steering instructions to the streamer steering devices along the streamer.

The above presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

BRIEF DESCRIPTION OF THE DRAWINGS

The invention may be understood by reference to the following description taken in conjunction with the accompanying drawings, in which like reference numerals identify like elements, and in which.

Figure 1:
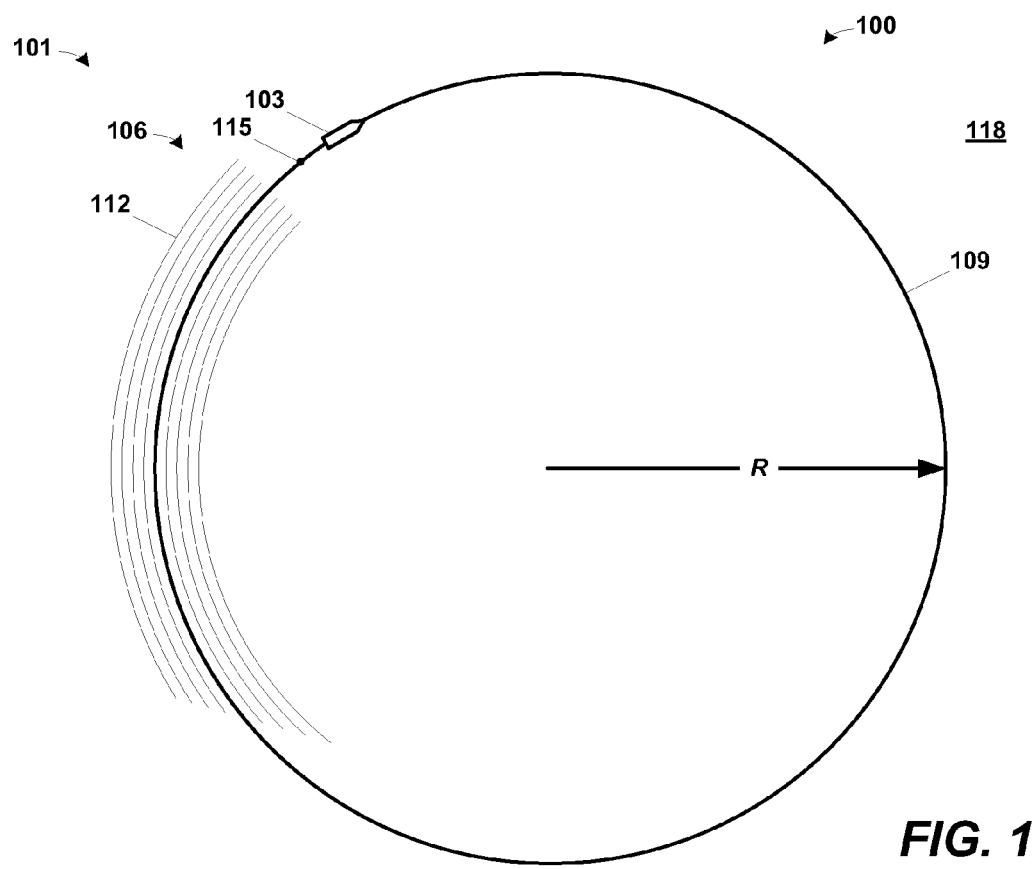
FIG. 1 is a plan, overhead schematic view of a portion of a first embodiment of a coil shoot with which the presently disclose technique may be used.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure. Furthermore, it is specifically intended that the present invention not be limited to the embodiments and illustrations contained herein, but include modified forms of those embodiments including portions of the embodiments and combinations of elements of different embodiments as come within the scope of the following claims.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

The presently disclosed technique allows real-time and post-survey quality control of survey element positions with respect to a substantially non-straight pre-survey plan as would be used in coil, spiral or circular shooting. The technique relates the object subjected to quality control to a dynamic reference frame and relates the coordinates of the object to the correct current path plan. More particularly, the invention is a mode of control based on a coil, curved, or circular shape of one or more of the streamers in the spread. The global controller coordinates the steering devices in a way that satisfies a group of objectives that includes maintaining curved shape as planned in the coil shooting plan, avoiding collision with adjacent streamers, updating the streamer shape in response to an updated coil shooting acquisition shape that better achieves the coil shooting geophysical objectives.

One particular embodiment compares the actual shape of all streamers based on the coordinate estimates of selected points along the streamers to a predetermined planned shape that will give the desired geophysical outcome assuming the source and receivers are in the planned positions. Steering commands are determined based on the difference between the actual and desired coordinates (steering residuals) of the streamer points. Steering commands can include changing wing angle of a steering device to obtain the angles of attack that gives the steering devices lift or side force that changes the shape of the streamer to match the planned streamer shape. It may include only a desired side force based on an assumed angle of attack.

Figure 2:
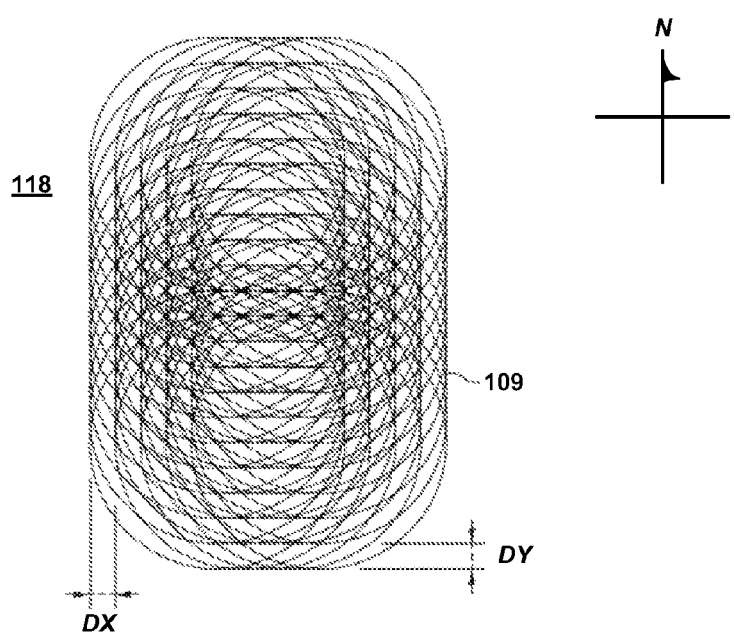
FIG. 2 is a computerized rendition of a plan view of the survey area covered by generally circular sail lines of the embodiment of FIG. 1 over time during a shooting and recording survey.
Figure 3:
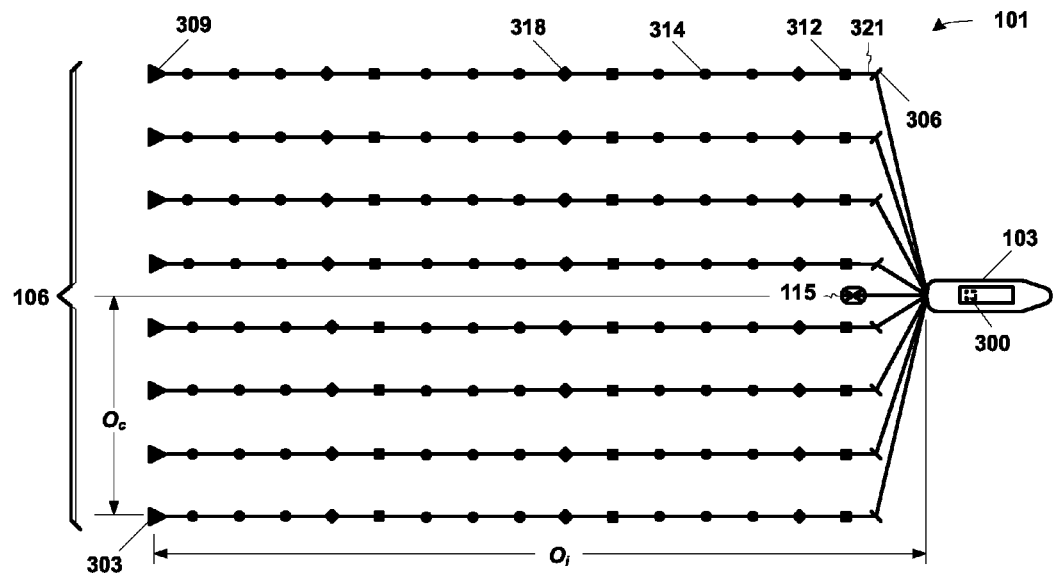
FIG. 3 depicts one particular embodiment of the survey spread first shown in FIG. 1 in a plan, overhead view.
Figure 7:
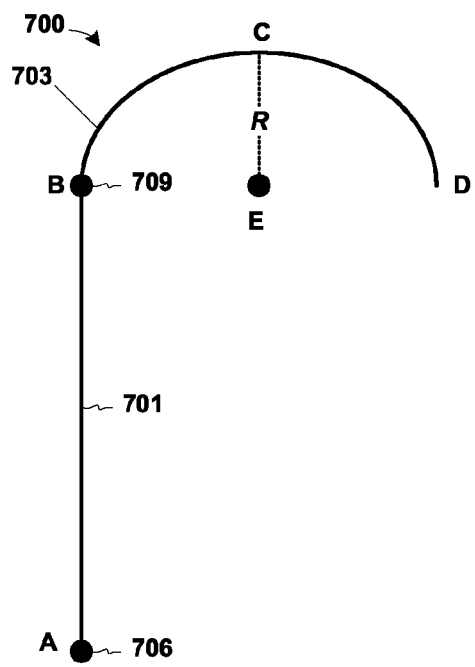
FIG. 7 illustrates a preplot curve and the determination of various characteristics thereof—namely, distance across and distance along.
Figure 8:
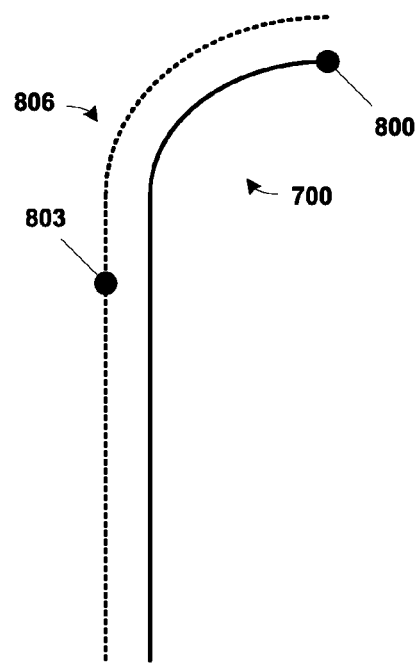
FIG. 8 illustrates the determination of nominal array element position given nominal offsets and a preplot curve.
Figure 9:
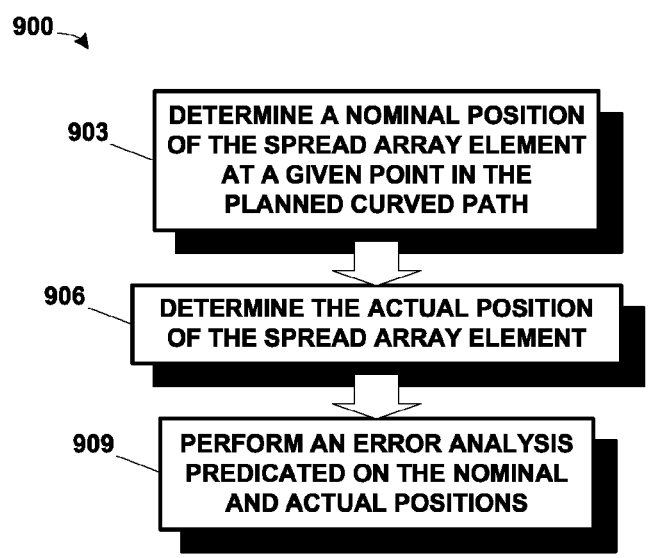
FIG. 9 illustrates one particular embodiment of a method for determining the deviation of seismic equipment from a planned curved path.
Figure 10:
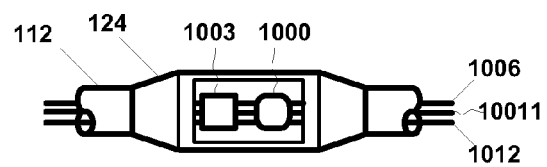
FIG. 10 illustrates the instrumented sondes of the streamers of survey spread in FIG. 3; and FIG. 11A
Figure 11A:
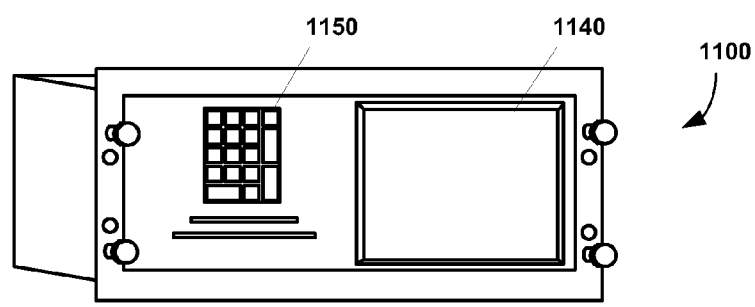
-FIG. 11B shows a rack mounted computer system such as may be used in some aspects of the present invention.
Figure 11B:
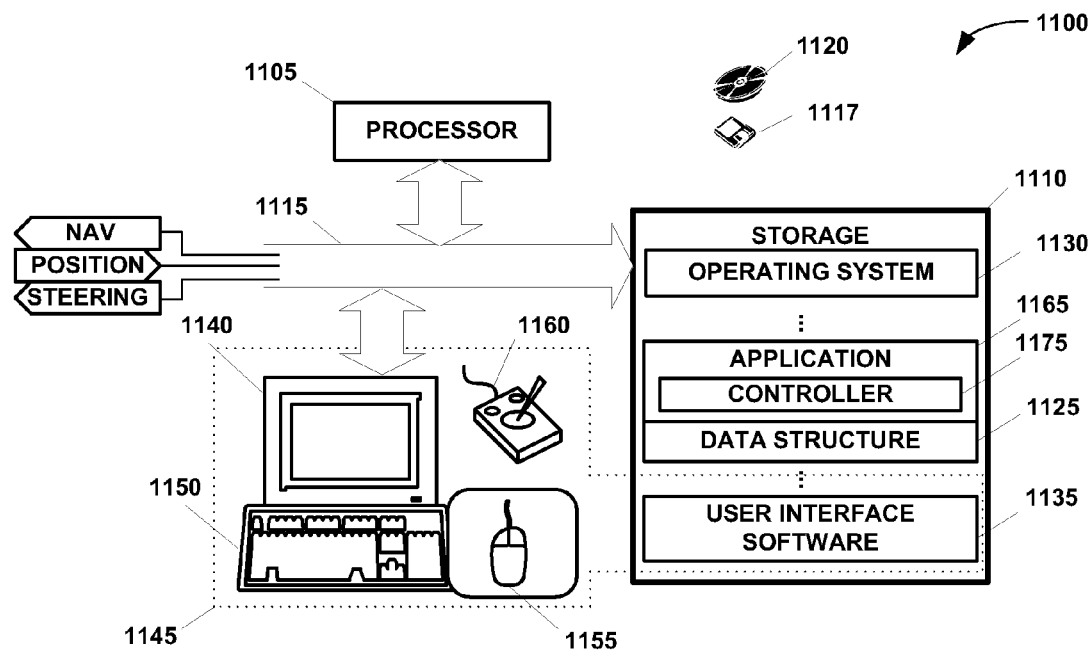

Turning now to the drawings, FIG. 1-FIG. 3 generally illustrate one particular embodiment of a coil shoot, towed-array marine seismic survey and one particular apparatus by which it may be performed. FIG. 4-FIG. 6B illustrate one particular technique for controlling the array elements' positions for the embodiment of FIG. 1-FIG. 3. FIG. 7-FIG. 9 illustrate one particular technique for determining the nominal positions of spread elements of the apparatus of FIG. 3 during the coil shoot survey of FIG. 1-FIG. 2. FIG. 10 depicts one implementation of the instrumented sondes first shown in FIG. 3. Finally, FIG. 11A-FIG. 11B depict one computing apparatus with which the control techniques of FIG. 4-FIG. 6B may be implemented.

FIG. 1 depicts a portion of a towed-array, marine seismic survey 100. The seismic survey 100 includes a seismic spread 101, which comprises a survey vessel 103 towing an array 106 on a generally advancing curved path over a sail line 109. In the illustrated embodiment, the array 106 includes a plurality of streamers 112 (only one indicated) and a source 115. As will be discussed further below, the invention admits a high degree of variation in the implementation of the spread 101 and the sail line 109. Those in the art will appreciate that the sail line 109 does not actually have a tangible manifestation, and that the line in the drawing graphically represents that which is intangible in practice. The seismic survey 100 is being conducted in a survey area 118.

Those in the art having the benefit of this disclosure will appreciate that the sail line 109 is not truly circular. Once the first pass is substantially complete, the survey 100 will move the spread 101 slightly in the y-direction (vertical) value of DY, as illustrated in FIG. 2. The spread may also move in the x-direction (horizontal) by a value DX. Note that "vertical" and "horizontal" are defined relative to the plane of the drawing.

FIG. 2 is a computerized rendition of a plan view of the generally circular sail lines 109 of the seismic spread 101 shown in FIG. 1 over time during a coil shooting and recording survey. The displacement from circle to circle is DY in the vertical direction and DX in the horizontal direction. In FIG. 2, several generally circular sail lines 109 (only one indicated) cover the survey area 118. In this example, the first generally circular sail line 109 was acquired in the southeast ("SE") corner of the survey.

Still referring to both FIG. 1 and FIG. 2, when a first generally circular sail line 109 is completed the vessel 103 moves along the tangent with a certain distance, DY, in the vertical direction, and starts a new generally circular sail line 109. Several generally circular sail lines 109 may be traversed until the survey border is reached in the vertical direction. A new series of generally circular sail lines 109 may then be acquired in a similar way, but the origin will be moved with DX in the horizontal direction. This way of shooting continues until the survey area is completely covered.

FIG. 3 depicts one particular embodiment of the survey spread 101 in a plan, overhead view. In this particular embodiment, as mentioned above, the seismic spread 101 generally includes an array 106 towed by a survey vessel 103. A computing apparatus 300 controlling the seismic spread 101 in a manner discussed more fully below is on board the survey vessel 103. The towed array 106 comprises eight streamers 112 (only one indicated). The seismic source 115 is also included. The survey spread 101 is shown after deployment but before embarking upon the sail line 109, shown in FIG. 1. Consequently, the streamers 112 are shown in a straight arrangement rather than the curved one of FIG. 1.

The array 106 also contains a number of positioning elements. For example, the array 106 of the illustrated embodiment includes steering devices known as "deflectors" 306 (only one indicated) and "birds" 312 (only one indicated). One suitable type of steerable bird is disclosed in U.S. Pat. No. 7,203,130, incorporated below. Other types of positioning elements are known to the art and may be used in various embodiments. For example, a positioning element comprising a ducted body is disclosed in U.S. Pat. No. 7,377,224, incorporated below. Some of these positioning elements are "steerable", meaning that they can steer themselves and, hence, a part of the array 106, to a desired position. In the illustrated embodiment, as will be discussed in further detail below, the birds 312 are steerable in both depth and crossline directions to help properly position other elements of the array 106 and maintain the shape thereof.

Figure 4:
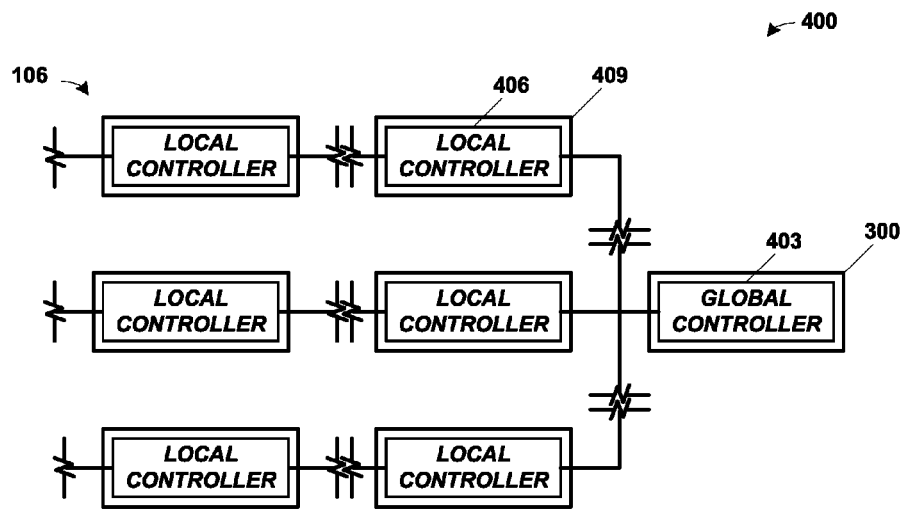
FIG. 4 is a block diagram of a control system for a towed array steering system.
Figure 5:
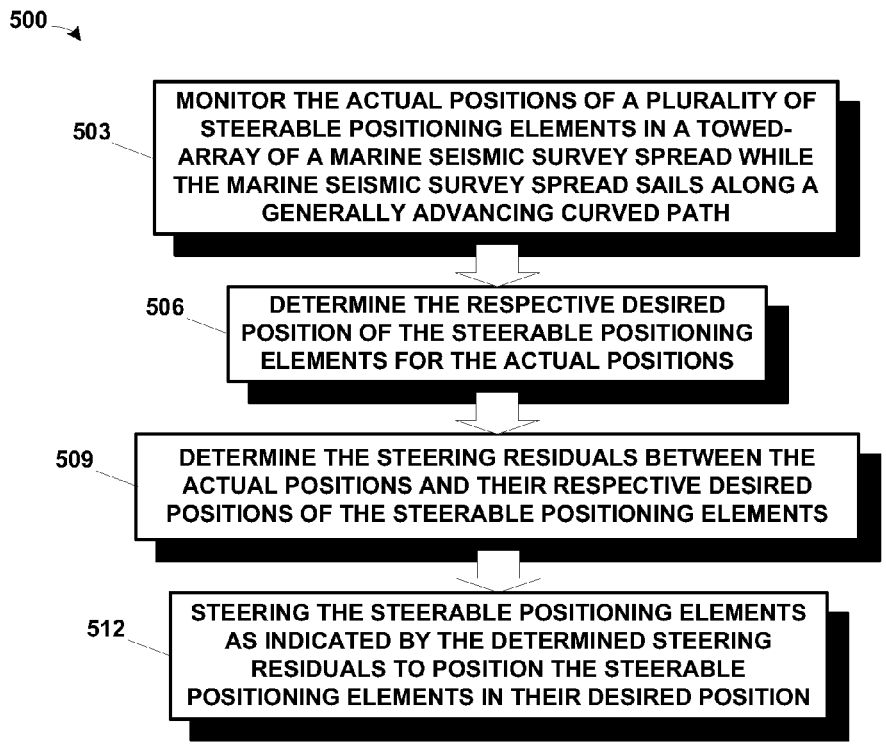
FIG. 5 illustrates one particular embodiment of a method for controlling the position of spread elements in a towed array in accordance with one aspect of the present invention.

FIG. 4 conceptually illustrates a position control system 400 of the array 106 such as may be used to implement one aspect of the presently disclosed technique. The system 400 includes a global controller 403, which may be implemented in the computing apparatus 300 aboard the survey vessel 103, both shown in FIG. 3. The position control system 400 also includes a plurality of local controllers 406 (only one indicated), each of which is associated with a steering device 409 (only one indicated). In the illustrated embodiments, the local controllers 406 comprise a part of the steerable birds 312, first mentioned above and discussed further below.

Note that, as in FIG. 3, the array 106 is shown in FIG. 4 after deployment but before embarking on the sail line 109. Those in the art having the benefit of this disclosure will appreciate that the number, location, and distribution of the local controllers in the array 106 will be implementation specific. Similarly, the identity and the nature of the steerable devices 409 will also vary by implementation. The practice of the invention is not limited by these kinds of factors except to the extent that they affect the efficacy of any given embodiment.

In general, and as will be discussed in greater detail below, the global controller 403 steers the various steering devices 409 to keep them in their pre-planned positions during the shoot and to maintain the shape of the array 106 in accordance with one aspect of the presently disclosed techniques. The global controller 403 monitors the positions of various elements of the array 106, compares them to their desired position relative to the sail line 109, and issues steering commands to the local controllers 406. The global controller 403, more particularly, executes a software-implemented method 500, illustrated in FIG. 5, comprising:

monitoring (at 503) the actual positions of a plurality of steerable positioning elements in a towed-array of a marine seismic survey spread while the marine seismic survey spread sails along a generally advancing curved path;

determining (at 506) the respective desired position of the steerable positioning elements for the actual positions;

determining (at 509) the steering residuals between the actual positions and their respective desired positions of the steerable positioning elements; and steering (at 512) the steerable positioning elements as indicated by the determined steering residuals to position the steerable positioning elements in their desired position.

Now, to further an understanding of the presently disclosed technique, selected implementation specific details of the illustrated embodiment will now be discussed in greater detail. This discussion will begin with the steerable birds 312, shown best in FIG. 6A-FIG. 6B. Next, a technique for determining deviations of various points on the array 106 from their desired position will be discussed relative to FIG. 7-FIG. 9. Additional details of the array 106 will be presented relative to FIG. 3 and FIG. 10. The particular control scheme implemented by the position control system 400, shown in FIG. 4, will then be discussed.

The steerable birds 312 of the illustrated embodiments are implemented with Q-fin™ steerable birds as are employed by WesternGeco, the assignee hereof, in their seismic surveys. The principles of design, operation, and use of such steerable birds are found in PCT International Application WO 00/20895, entitled "Control System for Positioning of Marine Seismic Streamers", filed under the Patent Cooperation Treaty on Sep. 28, 1999, in the name of Services Petroliers Schlumberger as assignee of the inventors Oyvind Hillesund et al. ("the '895 application"), incorporated below. Another suitable steerable bird is disclosed in U.S. Pat. No. 7,403,448, also incorporated below. In order to further an understanding of the presently disclosed technique, the following text relative to FIG. 6A-FIG. 6B is excerpted from this document.

Figure 6A:
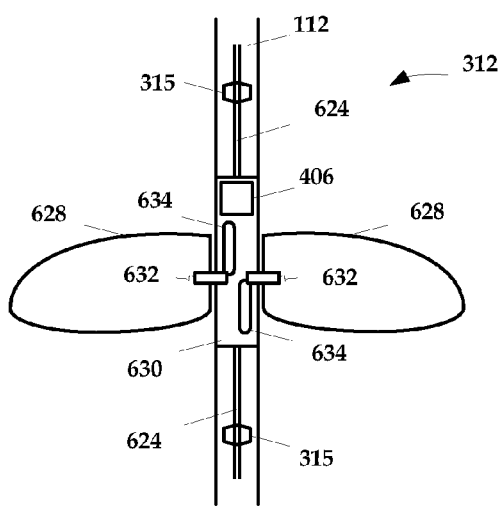
FIG. 6A-FIG. 6D illustrate various aspects of implementing the positioning devices of the survey spread shown in FIG. 3.
Figure 6B:
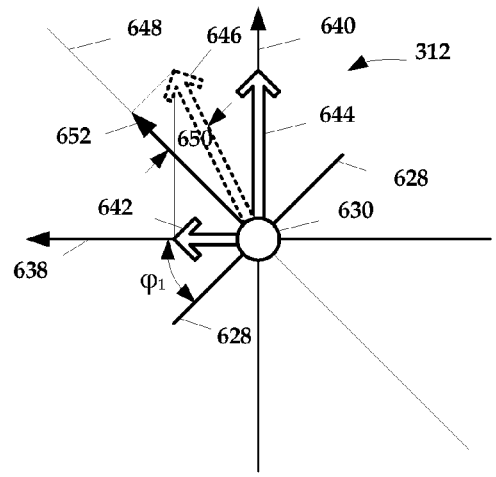

FIG. 6A shows one implementation of a bird 312 capable of controlling the position of streamers 112 in both the vertical and horizontal directions. A second embodiment of the bird 312 is disclosed in PCT International Application No. WO 98/28636, entitled "Control Devices for Controlling the Position of a Marine Seismic Streamer", filed Dec. 19, 1997, in the name of Geco A S as assignee of the inventor Simon Bittleston ("the '636 application"). A number of alternative designs for the vertically and horizontally steerable birds 312 are also possible, including those utilizing one full-moving wing with ailerons, three full-moving wings, and four full-moving wings.

In FIG. 6A, a portion of the streamer 112 is shown with an attached bird 312. A communication line 624, which may consist of a bundle of fiber optic data transmission cables and power transmission wires, passes along the length of the streamer 112 and is connected to the seismic sensors, seismic receivers 315, that are distributed along the length of the streamer 112, and to the bird 312. The bird 312 has a pair of independently moveable wings 628 connected to rotatable shafts 632 that are rotated by wing motors 634. This design allows the orientation of the wings 628 with respect to the bird body 630 to be changed. When the shafts 632 of the bird 312 are not horizontal, this rotation causes the horizontal orientation of the wings 628 to change and thereby changes the horizontal forces that are applied to the streamer 112.

The motors 634 may be any type of device capable of changing the orientation of the wings 628 relative to the streamer 112. They may be electric motors or hydraulic actuators for example. The local controller 406 controls the movement of the wings 628 by calculating a desired change in the angle of the wings 628 and then selectively driving the motors 634 to effectuate this change. This control is exercised within the context of instructions from the global controller 403, shown in FIG. 4, received over the communications line 624. Such instructions may include, for example, desired horizontal and vertical positioning. While the illustrated embodiment uses a separate motor 634 for each wing 628, it would be also be possible to independently move the wings 628 using a single motor 634 and a selectively actuatable transmission mechanism.

FIG. 6B shows a schematic vertical cross-sectional view through the steerable bird 312. The components of the bird 312 shown in FIG. 6B include the wings 628 and the body 630. Also shown in FIG. 6B are a horizontal (or "crossline") coordinate axis 638 and a vertical (or "in depth") coordinate axis 640. During operation of the streamer positioning control system 400, the global controller 403, shown in FIG. 4, transmits at regular intervals (such as every five seconds) a desired horizontal force 642 and a desired vertical force 644 to the local controller 406. The desired horizontal force 642 and the desired vertical force 644 are combined within the local controller 406 to calculate the magnitude and direction of the desired total force 646 that the global controller 403 has instructed the local control system to apply to the streamer 112. The global controller 403 could alternatively provide the magnitude and direction of the desired total force 646 to the local controller 406 instead of the desired horizontal force 642 and the desired vertical force 644.

While the desired horizontal force 642 and the desired vertical force 644 are preferably calculated by the global controller 403, the local controller 406 may calculate one or both of these forces using a localized displacement-force conversion program. This type of localized conversion program may, for instance, use a look-up table or conversion routine that associates certain magnitudes and directions of vertical or horizontal displacements with certain magnitudes and directions of changes in the vertical or horizontal forces required. Using this type of embodiment, the global controller 403 can transmit location information to the local controller 406 instead of force information. Instead of the desired vertical force 644, the global controller 403 can transmit a desired vertical depth and the local controller 406 can calculate the magnitude and direction of the deviation between the desired depth and the actual depth. Similarly, instead of transmitting a desired horizontal force 642, the global controller 403 can transmit the magnitude and direction of the displacement between the actual horizontal position and the desired horizontal position of the bird 312.

When the local controller 406 has a new desired horizontal force 642 and desired vertical force 644 to be applied, the wings 628 will typically not be in the proper orientation to provide the direction of the desired total force 646 required. As can be seen in FIG. 6B, the wings 628 introduce a force into the streamer 112 along an axis perpendicular to the rotational axis of the wings 628 and perpendicular to the streamer. This force axis 648 is typically not properly aligned with the desired total force 646 when new desired horizontal and vertical force values are received from the global controller 403 or determined by the local controller 406 and some rotation of the bird 312 is required before the bird 312 can produce this desired total force 646. As can be seen, the force axis 648 is directly related to the bird roll angle, designated in FIG. 6B as $\phi_1$.

The local controller 406 optimizes the control process by projecting the desired total force 646 onto the force axis 648 (i.e., multiplying the magnitude of the desired total force by the cosine of the deviation angle 650) to produce an intermediate desired force 652 and then adjusting the wing common angle $\alpha$ (the angle of the wings with respect to the bird body 630, or the average angle if there is a non-zero splay angle) to produce this magnitude of force along the force axis. The calculated desired common wing angle is compared to the current common wing angle to calculate a desired change in the common wing angle and the wing motors 634 are actuated to produce this desired change in the orientation of the wings.

A splay angle is then introduced into the wings 628 to produce a rotational movement in the bird body 630 (i.e., to rotate the force axis 648 to be aligned with the desired total force 646). The splay angle is the difference between the angles of the wings 628 with respect to the bird body 630. As the bird body 630 rotates and the force axis 648 becomes more closely aligned with the desired total force 646, the bird roll angle and the bird roll angular velocity are monitored, the splay angle is incrementally reduced, and the common angle is incrementally increased until the intermediate desired force 652 is in the same direction and of the same magnitude as the desired total force. The local controller 406 carefully regulates the splay angle to ensure that the streamer is stable in roll degree of freedom. The calculated common wing angle and the splay angle are also regulated by the local controller 406 to prevent the wings 628 from stalling and to ensure that the splay angle is prioritized.

In the technique described above, the desired force as a function of wing angle cannot be directly known. This is because the angle of attack must be known in order to know how a wing angle will translate into a force. In some embodiments, neither the global nor the local controllers have knowledge of angle of attack. They instead assume an angle of attack based on vessel motion. The body orientation of the birds relative to the streamer and water flow vector relative to the streamer are not measured or otherwise estimated.

When towing a curved streamer, some of the towing force pulls the streamer towards the center of the curved streamer shape. Thus, a component of motion that is assumed to generate water flow over the wings and is caused by towing has a different inline component compared to the straight tow case. Steering efficiency could be bettered by taking this into consideration. The actual movement of the bird through the water can be measured by computing the "course made good" ("cmg") of the bird. Navigation data permits this computation.

Knowing the bird's body orientation can also increase steering efficiency, but this is not peculiar to the coil towing situation. Similarly, knowing the instantaneous local current, and combining it with the cmg will again increase the steering efficiency. This again is different from the straight tow case because the wings change orientation with respect to the current as they travel through the coil shape. The deterministic character of the water flow change permits Model Predictive Control ("MPC"), described further below.

Figure 6C:
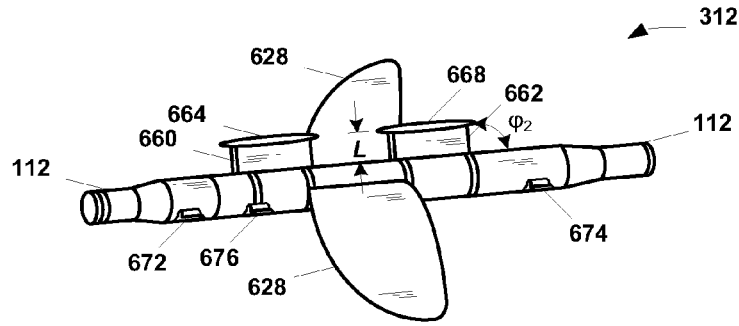

One technique meeting these concerns is disclosed in U.S. Pat. No. 7,403,448 ("the '448 patent"), incorporated below, and portions of which will now be excerpted. FIG. 6C illustrates in a perspective view a modification to the steerable bird of FIG. 6A, with portions cut away to reveal certain features. Two members 660, 662 extend away from steerable bird body 630 at a known distance L and known angle, $\phi_2$. Members 660, 662 respectively support dual acoustic sensors 664, 668. The steering device body 630 orientations may be determined since the length L and angle $\phi_2$ are known.

Alternatively, the acoustic sensors 664, 668 may each be inside of body 630 of the bird 312. The differenced measurements from the acoustic sensors 664, 668 provide information about one angle of orientation and combined with other information as explained below the complete set of all three attitude angles may be resolved and thus give the orientation of body 630, the steering device body to which wings 628 are attached. Steering device body 630 may be assumed to be nearly horizontal in the common reference frame or so near to horizontal that the error from the incorrect assumption is negligible. Additional instrumentation to determine the vertical orientation, such as pressure sensors 672, 674, may be added. An inclinometer 676 may provide equivalent information. Accelerometers (not shown) or inclinometers (not shown) sensitive to the roll angle are also employed. This may also be true for the assumption of a nearly horizontal device as it may be a false assumption to neglect any twist.

Alternative instrumentations may be used in alternative embodiments. For example, one might use a gimbaled device (not shown). Alternative embodiments not shown herein might employ a gimbaled device, or magnetic compasses, a tri-axial magnetometer, or inertial measurement devices in varying combinations. Additional information on these embodiments is provided in the '448 patent.

To generalize, one needs to measure three angles of orientation in a manner such that each of them have at least a component independent of the other two to ensure that all three degrees of freedom are fixed. This may be achieved by combining three of the simple measurements (any choice among acoustics, pressure and inclinometer) or combining a tri-axial magnetometer or a tri-axial accelerometer with one of the simple measurements. An inertial platform may be employed by itself. For higher accuracy, the position of the steering device must be known with greater precision. The required accuracy depends heavily on the types of measurements employed and the orientation accuracy needed, and it may vary from the meter level to the kilometer level.

Figure 6D:
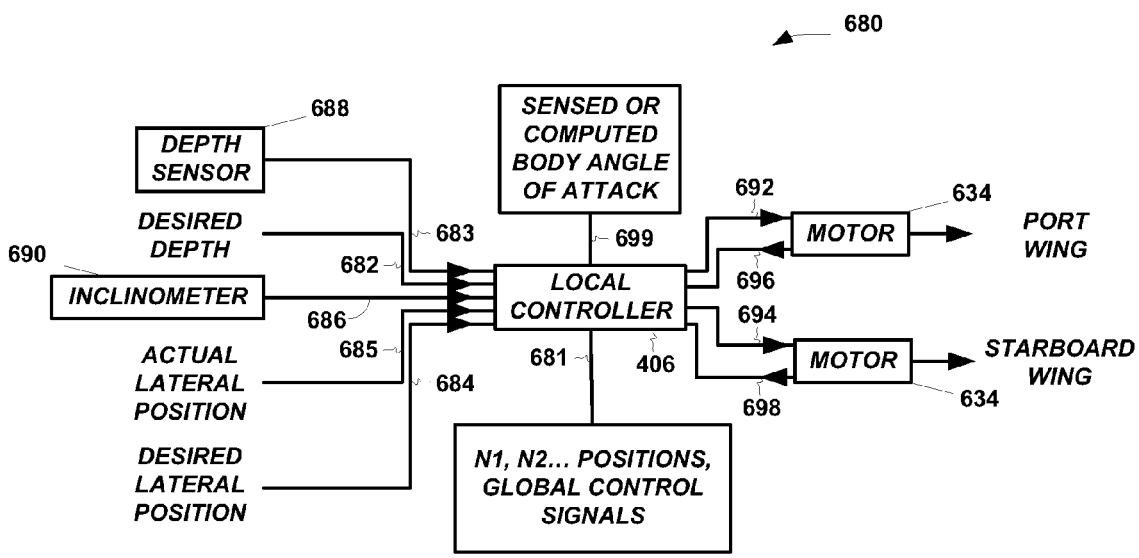

FIG. 6D is a schematic diagram of a control scheme 680 for controlling the bird 312 of FIG. 6C. The control scheme 680 comprises the local controller 406. In this particular embodiment, the local controller 406 is a microprocessor-based local controller 406. The local controller 406 has respective inputs 682-686 to receive control signals representative of desired depth, actual depth, desired lateral position, actual lateral position and roll angle of the bird 312 (i.e., the angular position of the body 630 in a plane perpendicular to the longitudinal axis of the streamer 112).

The desired depth signal on the line 682 can be either a fixed signal corresponding to the 10 meters, or an adjustable signal. The actual depth signal on the line 683 is typically produced by a depth sensor 688 mounted in or on the bird 312 in a manner not shown. The lateral position signals on the lines 684, 685 are typically derived from a position determining system of the kind described in our U.S. Pat. No. 4,992,990 or our International Patent Application No. WO9621163.

The roll angle signal 686 is produced by an inclinometer 690 mounted within the bird 312 in a manner not shown. The local controller 406 has two control outputs 692, 694, connected to control respective electrical stepper motors 634, each of which is drivingly connected to a respective one of the wings 628. The stepper motors 634 have respective outputs at which they produce signals representative of their respective current angular positions (and therefore of the current angular positions of the wings 628), which outputs are connected to respective control inputs 696, 698 of the local controller 406. In operation, the local controller 406 receives between its inputs 682 and 683 a signal indicative of the difference between the actual and desired depths of the bird 312, and receives between its inputs 684 and 685 a signal indicative of the difference between the actual and desired lateral positions of the bird 312.

The actual lateral position of steerable birds 312 may be determined for instance by using GPS combined with an acoustic positioning system, such as a long-baseline network adjustment, short-baseline ("SBL") or ultra-short baseline ("USBL") acoustic systems. Acoustic distances, magnetic north referenced directions and global navigation satellite systems ("GNSS") surface control can also be combined with a force model to compute the position of the steerable birds. This information, combined with previously known 3-D coordinates of acoustic transmitters, is sufficient to calculate the positions of transmitters at the time of measurement. By further using the information about the measured distances and differences it is possible to calculate the position of an acoustic receiver on or near a bird that has received the signals. All receivers in or on a streamer cable, including receivers on birds, can in this way be tracked for the purpose of deployment precision, increased operational safety, and increased efficiency.

The two difference signals for depth and lateral position, along with any feed-forward information received through input 699, any information about other orientation members N1, N2, etc., and any supervisory control signals received from a global controller through input 681 are used by the local controller 406 to calculate the roll angle of the bird 312 and the respective angular positions of the wings 628. Together, these will produce the necessary combination of vertical force (upwardly or downwardly) and lateral force (left or right) required to move the bird 312 to the desired depth and lateral position. The local controller 406 then adjusts each of the wings 628 independently by means of the stepper motors 634, so as to start to achieve the calculated bird roll angle and wing angular positions.

Knowledge of the angle of attack of body the 630 of the steering device 312 is obtained through one or more of the methods and apparatus detailed above, and indicated in the control scheme of FIG. 6D by feedback 699. This feedback 699 is used to optimize the angular position of wings 628 and, ultimately, the angle of attack of body 630. A feed-forward controller, as indicated by input 699 in FIG. 6C, may utilize information about currents, wind, and other environmental conditions, in order to counteract for any deviations relative to the nominal that may be predicted to take place, and do so before the deviation actually takes place or to do so in an early stage of the deviation. An adaptive control scheme may also be used.

When using the type of birds described in the '636 application, where the bird 312 is rigidly attached, and cannot rotate with respect, to the streamer 112, the control system should take the streamer twist into account. Otherwise, the bird 312 can use all of its available splay angle to counter the twist in the streamer 112. The bird 312 will then be unable to reach the demanded roll angle and the generated force will decrease.

In the anti-twist function, the streamer twist is estimated by weight-function filtering the splay angle measurements instead of simply averaging the splay angle measurements to improve the bandwidth of the estimation. The anti-twist function engages when the estimated twist has reached a critical value and it then overrides the normal shortest path control of the calculated roll angle. The anti-twist function forces the bird 312 to rotate in the opposite direction of the twist by adding ±180° to the demanded roll angle. Once the twist has been reduced to an acceptable value, the anti-twist function disengages and the normal shortest path calculation is continued.

The untwist function is implemented by the global controller 403 which monitors the splay angle for all of the birds 312 in each streamer 112. At regular intervals or when the splay angle has reached a critical value, the global controller 403 instructs each local controller 406 to rotate each bird 312 in the opposite direction of the twist. The number of revolutions done by each bird 312 is monitored and the untwist function is disengaged once the twist has reached an acceptable level.

However, to correctly determine steering corrections for the bird 312, the global controller 403 needs to know the actual position of the steering device relative to its desired position. One particular technique is disclosed in U.S. Application Ser. No. 61/061,330, filed on Jun. 13, 2008, in the name of the inventors Johan Hauan, et al., and entitled, "Method to Determine the Derivation of Seismic Equipment From a Planned Curve Path". To further an understanding of the present invention, portions of that application will now be excerpted. Note, however, that alternative techniques may be used in alternative embodiments. Two such alternative techniques are also disclosed below.

FIG. 7-FIG. 9 illustrate the manner in which the illustrated embodiments determine the variation from their intended position during the survey. As those in the art will appreciate, the sail lines 109 of the seismic survey 100 are determined with a great deal of consideration. Preliminary data about the area under survey is used to define the characteristics of the survey and the sail lines 109 are determined. These nominal sail lines 109 that are determined prior to the survey may be referred to as "preplots" for the actual sail lines 109 traversed by the seismic spread 101. In the present case, since the survey will employ a coil shoot, the preplots are at least in part curved, and so may be referred to as "preplot curves".

Alternatively, a given survey might use a "navigation plan". A navigation plan is a set of coordinates, either Cartesian or Polar, in two or three dimensions, that describe the desired positions for seismic sources and receivers over the full extent of a survey area. The coordinates may be stored for a select set of spread elements such as source and streamer points, or they may be computed based on one reference point, the one that is used as the preplot reference.

For example, the preliminary data will indicate the density of the sampling that will be desired for the survey area 118. The design parameters for designing the survey 100 in light of the desired sampling density include: the radius R of the circle, the radius being a function of the spread width and also of the coverage fold desired; DY, the roll in the y-direction; and DX, the roll in the x-direction. DX and DY are functions of streamer spread width and of the coverage fold desired to be acquired. The radius R of the circle may be larger than the radius used during the turns and is a function of the streamer spread width.

The total number of kilometers acquired over a given area depends on the circle radius R and the values DX and DY. The total number of shots acquired with the coil shooting technique disclosed herein increases with increased radius R. DX and DY may range from about 0.5 W to about 2 W, or from about 0.5 W to about W, where W is the streamer spread width. The value of DX and DY may be selected based on the survey objectives. For instance, for a development type survey, DX and DY should be smaller than for an exploration survey. Also, as DX and DY determine the source sampling, processing requirements should be considered when the survey is designed.

It is desirable for the sail lines 109 to precisely coincide with their preplot curves or navigation plans. This desire also extends to the elements of the array 106 relative to their preplot positions. This can be particularly difficult to achieve for the array 106. For example, the survey vessel 103 has its own means for propulsion and navigation, and can typically maintain its position on the preplot quite well. However, this is not true of the array. The streamers 112, for example, are particularly subject to strong currents and weather conditions to be driven off the preplot during the survey.

The techniques disclosed herein are intended for use in determining specifically the crossline deviation of the elements of the seismic spread 101 from the preplot curve so that position corrections can be made. The only horizontal direction the steering devices can exert force is crossline to the direction of motion (i.e., in a curve, the steering bird may have a different direction to the towing vessel). Thus determining the difference between the plan and actual spread element position in the crossline direction is key to determining how much crossline force to exert. This determined deviation can then be used to formulate steering commands for the steering elements of the array 106.

Turning now to FIG. 7, a preplot curve 700 is a sequence of geographical coordinates and a radius R. The preplot curve 700 gives the nominal position for some point in the survey at a given time. This normally coincides with the desired position of a survey element for this point. (For repeat/4D surveys, this is not necessarily true—it then describes the nominal position, but not necessarily the desired position.) Often, the preplot curve describes the desired source mid-point position.

One way of describing the position of various elements of the seismic spread 101 within the array 106 is in terms of inline and crossline offsets $O_i$ and $O_c$, respectively. The technique also determines where equipment is compared to where it was planned to be. Consider the rightmost tail buoy 303 in FIG. 3. The rightmost tail buoy 303 might, for example, have a nominal crossline offset of 200 meters and an inline offset of 8000 meters. (That is, if the vessel was going straight, one would expect the equipment to be 8000 meters behind (with minus sign) a vessel reference origin 103 and 200 meters to the starboard.) So during the survey one might want to know where the tail buoy 303 should be, for example, shot number 1024. The vessel 103 is in a curved segment. The technique disclosed herein finds this point by making a parallel curve starting 200 meters crossline starboard from the nominal vessel crossline/inline reference frame and moving 8000 meters in the negative direction along this curve.

As shown in FIG. 7, a part of the pre-plot line is a straight line that is connected to a circular curve. The coordinates of any spread element can be computed by just projecting a crossline distance from the inline offset of interest. Computing the inline offset requires either integrating distance along the preplot curve to determine the inline distance and determining the orthogonal direction from inline direction at the distance of interest. For the curved part of the preplot, using the radius of curvature for the streamer of interest and sweeping through angular rotation that gives the proper arc distance for elements in the curve also gives the cross line direction. The origin of the radius of curvature for the preplot is a preplot parameter.

It is important to distinguish between the nominal and actual vessel crossline/inline reference frame since the vessel may have a crab angle. The course made good (cmg) is the direction of actual trajectory of any point on the vessel and may be different from the vessel inline axis direction due to vessel crab. Further, the cmg may be different from the preplot or navplan trajectory.

Thus, all equipment in the array 106 has a nominal offset. That is, the x-y coordinates in a coordinate system with origin at the vessel and y axis in the sail direction. It is assumed straight streamers etc. The values are calculated based on known characteristics of the seismic spread 101, such as lengths of equipment. In the example given above, the rightmost tail buoy 303 of the seismic spread 101 has an inline offset $O_i$ of 8000 meters behind the survey vessel 103 and a crossline offset $O_c$, of 200 meters to the right. That is, if the survey vessel 103 was traveling in a straight line, one would expect the equipment to be 8000 meters behind the vessel and 200 meters to the right. The nominal offset will be known as a design feature of the seismic spread 101.

Consider now Distance Across and Distance Along determinations. Given that the nominal offsets for all equipment are known, it does not really matter to what the preplot curve 700 refers. The nominal offsets can be transformed to refer to some other point on the preplot curve 700. For example, assume that the line AB in FIG. 7 is 500 m, the half circle BD is 200 m, and the line CE is 50 m. To find the distance across and the distance along (collectively, "DA/DC") for point E, the determination is as follows:

$$DA=500+200/2=600$$

$$DC=50$$

Note that this defines a new type of coordinate system 'normalized' to a varying path. In conventional straight tow, the transform between Easting/Northing and DA/DC is two different coordinate systems with different orientations and different origins. This new way of calculating still relatively easily transforms DA/DC to Easting/Northing, although the transform of Easting/Northing to DA/DC presents difficulty because of the nature of the coil shoot.

One alternative technique uses Cartesian coordinates. As shown in FIG. 7, a preplot curve 700 is a sequence of geographical coordinates. A tangent at any one of these geographical coordinates gives the inline direction in the northing and easting reference frame of that offset. The inline distance of a spread element can be obtained by integrating along the pre-plot curve. The crossline offset is then just the offset distance to the element with the correct sign and 90 degree difference from the inline or tangent direction in the chosen reference frame.

The computation for the inline direction in the northing and easting reference frame along a curve is;

$$\text{Inline}(\alpha)=\text{Arctan}(dN/dE)$$

where $$dN=N_x-N_{x+2} \text{ and } dE=E_x-E_{x+2}$$

and $$N=\text{northing}$$

$$E=\text{easting}$$

and $$x=\text{any shot number}$$

Alternatively, at any shot, x can be the coordinates of a point behind and x+2 the coordinates of a point ahead, with x+1 the point for determining the direction.

For Quality Control of the spread element relative to the planned coordinates or for determining the steering residual of the positions, any actual value of a spread element can be subtracted from the preplot value to get dN and dE and the steering residuals can then be rotated into the inline and crossline components with the rotation matrix.

$$\begin{bmatrix} dx \\ dy \end{bmatrix} = \begin{bmatrix} \cos\theta & \sin\theta \\ -\sin\theta & \cos\theta \end{bmatrix} \begin{bmatrix} de \\ dn \end{bmatrix}$$

Where de and dn are the residuals between the actual and planned coordinates.

A second alternative technique uses polar coordinates. Any N and E can be represented as $\rho$ and $\Phi$. This means the actual N and E can be converted to $\rho$ and $\Phi$ and differenced from the preplot $\rho$ and $\Phi$ for quality control purposes. The inline and crossline differences can then be computed from the $d\rho$ and $d\Phi$ values rotated into the local cross line and inline directions. The local cross line direction is the $\Phi$ value for the actual position. The difference between actual $\Phi$ and preplot $\Phi$ is the rotation value to be used to resolve the cross line residual component of $d\rho$.

Imagine two circles (not shown). A position can easily be as close to one as to the other. Also a position occurred at some time, which means it belongs to one of the circles. However the transform with the aid of a shot number makes sense:

$$\text{Easting/Northing}+\text{shotNumber} \rightarrow DA/DC$$

One will first find either a straight or curved segment where this shot number occurs, then perform a local search to find the closest position in that area, calculate DA to this point, and the DC is given by the distance to this closest point.

Consider now the calculation of nominal positions for spread elements, in which it will be assumed that the spread elements follow the preplot curve 700 perfectly. In calculating nominal positions, given a shot number, one can calculate a corresponding preplot position 800, shown in FIG. 8. It is a bit more complex calculating a position given with a nominal crossline/inline offset from the preplot curve 700. Assume that other position 803 to be calculated has a crossline nominal offset of −100, and an inline nominal offset of −1000. To find the nominal offset, one moves 1000 meters backwards on the parallel line 806. The distance between the lines is then 100 meters.

In general, the task can be divided into two parts. First, the nominal (desired) positions for any piece of equipment is determined given equipment nominal offset and shot number. Second, error statistics are calculated given actual positions.

Returning to FIG. 7, the preplot curve 700 for a coil shoot survey consists of straight segments 701 and circular segments 703. Straight segments 701 and circular segments 703 are collectively referred to as "path segments". Each preplot curve 700 therefore comprises a plurality of path segments that are either straight segments 701 or circular segments 703. For each straight segment 700, the start position 706 and the end position 709 are known. For each circular segment 703 the origo, the start position, and the total circle segment angle are known.

For each path segment certain attributes may be determined, and the determination will vary for the segments 701, 703. The segment length, for example, is a function of nominal offset x. The segment length for a straight segment 700 is the length of the segment from its start 706 to its end 709. For circular segments 703, segment length will vary with different crossline offsets because a crossline offset will effectively increase or decrease the circle radius. Position and heading are a function of along and across distance. Given a certain distance from the start of a segment and a certain crossline offset, one can calculate a position with a heading. For circular segments 703, this will be a tangent to the circle at that point. For a straight segment 700 it will be the direction from the start 706 to the end 709. The closest segment position and heading are a function of actual position. Given an actual position, the closest position on the segment may be found.

Given a sequence of path segments 701, 703 and the shot increment, the shot distance, and the first shot number, one can calculate certain attributes. The shot increment is how the shot numbers change. Usually it is plus or minus one. If the first shot point is 1000, and the shot increment is 1, the next shot number will be 1001. The shot distance is the meter difference between two shots. If the shot distance is 25 meters, it should be 25 meters between where shot 1000, and 1001 is fired.

The higher level functions are: (1) nominal position and heading and (2) across and along.

Nominal position and heading are a function of shot number, nominal offset x and nominal offset y. Ignoring the offset, one can easily find which path segment 700, 703 contains the position for that shot because the length of each segment is known. Having found that position, certain other calculations are performed to compensate for the nominal offsets. This might bring one to another segment path altogether. This function is also used as a basis for calculating the difference between nominal position and actual position based on shot number. Returning the nominal position and the heading this can be done by making a coordinate system with origin in the nominal position, y axis in the heading direction and transforming the actual position to this coordinate system. The new x and y coordinates of the transformed position would then denote crossline and inline position error compared to nominal positions.

Across and along are functions of shot number, nominal offset x, nominal offset y and actual position. Given an actual position, one cannot uniquely find a closest path position. Or rather, it might not make much sense. An actual position might be just as close to a point on one circle as another, even though the position actually 'occurred' on the other circle. The shot number therefore needs to be considered. First, find which segment the position nominally should belong to, using shot numbers and nominal offsets. Then do a local search to find the closest position to the actual position. This may be on another segment altogether. The closest position will yield the distance along value. The distance between the closest position and the actual position will give the across value.

Thus, the presently disclosed techniques includes a method for determining the deviation of spread array element from a planned curved path during a towed-array marine seismic survey comprising:
  determining (at 903) a nominal position of the spread array element at a given point in the planned curved path;
  determining (at 906) the actual position of the spread array element; and
  performing (at 909) an error analysis predicated on the nominal and actual positions.

The error analysis can be the same types of error analyses performed in this context in conventional practice where the analysis is performed upon information from a conventional sail line following a straight path.

More particularly, performing (at 909) the error analysis in FIG. 9 is what occurs after computing the nominal and the actual positions relative to the path. For example:
  the difference between the desired position and the actual position (of steered survey elements) is used by the steering system (e.g., DSC/Q-Pilot) to issue steering commands so that the path is followed;
  the difference may also be used to produce plots of the error (deviation from the desired position in an across/along reference frame) for display to the user (monitoring the system performance) in real time; and
  the path-relative across values (and across/along separations between survey elements) are used to compute statistics that can prove whether or not the certain survey specifications are being met, and also produce plots for display (manual QC) to the user.

This list is not exhaustive, and those of ordinary skill in the art having the benefit of this disclosure will appreciate still other error analyses that may be performed in addition to, or in lieu of, those listed. Note that such statistics (e.g., crossline distance between seismic source and streamer arrays) are usually required in any seismic survey, but are meaningless in a conventional fixed coordinate system traditionally used for straight line seismic when used for a coil shoot. (Across and along blend as the circle is traversed.)

Returning now to FIG. 3, as mentioned above, the seismic spread 101 generally includes an array 106 towed by a survey vessel 103 on board of which is the computing apparatus 300. The towed array 106 comprises eight marine streamers 112 (only one indicated) that may, for instance, each be 6 km long and separated by up to 100 m. Note that the number of streamers 112 in the towed array 106 is not material to the practice of the invention. These aspects of the apparatus may be implemented in accordance with conventional practice.

Note that these distances discussed herein are "approximate." As used herein, the term "approximate" acknowledges that which is commonly known in the art—namely, that it is difficult to consistently maintain the position of the streamers 112 throughout the entire seismic survey 101. Environmental conditions, such as tides and winds, frequently push all or parts of the streamers 112 out of their desired positions during the seismic survey 101. Accordingly, as is discussed further below, the streamers 112 include positioning elements to help offset these types of factors. Deviations from desired positions nevertheless occur and they may affect the crossline cable separation. The term "approximately" is a reflection of this reality and indicates that deviations from the modified distance that are within a degree commonly accepted by those in the industry in this context.

A seismic source 115 is also shown being towed by the survey vessel 103. Note that, in alternative embodiments, the seismic source 115 may not be towed by the survey vessel 103. Instead, the seismic source 115 may be towed by a second vessel (not shown), suspended from a buoy (also not shown), or deployed in some other fashion known to the art. The known seismic sources include impulse sources, such as explosives and air guns, and vibratory sources which emit waves with a more controllable amplitude and frequency spectrum. The seismic source 115 may be implemented using any such source known to the art. In the illustrated embodiment, the seismic source 115 comprises an air gun or an array of air guns At the front of each streamer 112 is a deflector 306 (only one indicated) and at the rear of every streamer 112 is a tail buoy 309 (only one indicated). The deflector 306 laterally, or in the crossline direction, positions the front end 321 of the streamer 112 nearest the survey vessel 103. The tail buoy 309 creates drag at the tail end 114 of the streamer 112 farthest from the survey vessel 103. The tension created on the streamer 112 by the deflector 306 and the tail buoy 309 helps shape the streamer 112.

Located between the deflector 306 and the tail buoy 309 are the "birds" 312 discussed above and shown best in FIG. 6A-FIG. 6B. The birds 312 may be located at regular intervals along the seismic cable, such as every 200 m to 400 m. In this particular embodiment, the birds 312 are used to control the depth at which the streamers 112 are towed, typically a few meters.

The streamers 112 also include a plurality of instrumented sondes 314 (only one indicated) distributed along their length. The instrumented sondes 314 house, in the illustrated embodiment, an acoustic sensor 1000 (e.g., a hydrophone) such as is known to the art, and a particle motion sensor 1003, both conceptually shown in FIG. 10. The particle motion sensors 1003 measure not only the magnitude of passing wavefronts, but also their direction. The sensing elements of the particle motions sensors may be, for example, a velocity meter or an accelerometer.

Suitable particle motion sensors are disclosed in: U.S. application Ser. No. 10/792,511, filed Mar. 3, 2004; U.S. application Ser. No. 10/233,266 filed Aug. 30, 2002; and U.S. Pat. No. 3,283,293, issued Nov. 1, 1966. Any suitable particle motion sensor known to the art may be used to implement the particle motion sensor 1003. Thus, it would be possible to distinguish data representing upwardly propagating wavefronts from the downwardly propagating wavefronts 150.

The sensors 1000, 1003 of the instrumented sondes 314 then transmit data representative of the detected quantity over the electrical leads of the streamer 112. The data from the acoustic sensors 1000 and the particle motion sensors 1003 may be transmitted over separate lines. However, this is not necessary to the practice of the invention. The data generated by the particle motion sensor 1003 will therefore need to be interleaved with the seismic data. Techniques for interleaving information like this are known to the art. For instance, the two kinds of data may be multiplexed. Any suitable techniques for interleaving data known to the art may be employed.

Thus, the data generated by the sensors of the instrumented sondes 314 is transmitted over the streamer 112 to the computing apparatus 300. As those in the art will appreciate, a variety of signals are transmitted up and down the streamer 112 during the seismic survey. For instance, power is transmitted to the electronic components (e.g., the acoustic sensor 1000 and particle motion sensor 1003), control signals are sent to positioning elements (not shown), and data is transmitted back to the vessel 103. To this end, the streamer 112 provides a number of lines (i.e., a power lead 1006, a command and control line 1009, and a data line 624) over which these signals may be transmitted. Those in the art will further appreciate that there are a number of techniques that may be employed that may vary the number of lines used for this purpose. Furthermore, the streamer 112 will also typically include other structures, such as strengthening members (not shown), that are omitted for the sake of clarity.

The sail lines preplots 700 are generated prior to the conduct of the survey 100. Preliminary studies of the survey area 118 are made to determine survey characteristics that inform the design of the survey 100 itself. In association with the presently disclosed technique, this is done in accordance with conventional practice. This is typically performed at a central processing facility of some kind that houses a computing system.

The survey design is then transported to the survey vessel 103 and loaded onto the computing apparatus 300. The computing apparatus 300 represents a variety of computing resources that fulfill a number of purposes in the survey 100. For example, and as will be appreciated by those in the art having the benefit of this disclosure, the survey vessel 103 will be equipped with computer-implemented navigation and control systems. However, these functionalities may be distributed across elements of the seismic spread 101 rather than concentrated in a single computing apparatus. Furthermore, the nature of the software control in terms of architecture or situs is not material to the practice of the invention. For example, in some embodiments, the navigation and streamer steering may be performed by separate software components that may be, for instance, utilities or daemons.

FIG. 11A-FIG. 11B depict a rack-mounted computing apparatus 1100 with which the navigation and control systems may be implemented. The computing apparatus 1100 includes a processor 1105 communicating with some storage 1110 over a bus system 1115. The storage 1110 may include a hard disk and/or random access memory ("RAM") and/or removable storage such as a floppy magnetic disk 1117 and an optical disk 1120. The storage 1110 is encoded with a data structure 1125 storing the data acquired in the survey 100, an operating system 1130, user interface software 1135, and an application 1165.

The user interface software 1135, in conjunction with a display 1140, implements a user interface 1145. The user interface 1145 may include peripheral I/O devices such as a key pad or keyboard 1150, a mouse 1155, or a joystick 1160. The processor 1105 runs under the control of the operating system 1130, which may be practically any operating system known to the art. The application 1165 is invoked by the operating system 1130 upon power up, reset, or both, depending on the implementation of the operating system 1130. The application 1165 includes a controller 1175 in which the navigation and control functionalities of the illustrated embodiment are implemented.

The controller 1175 has a navigation component and an array controller component, called herein the global controller 403. The navigation component issues navigation commands ("NAV") to the survey vessel 103 in accordance with its program to sail the survey vessel 103 on the generally advancing curved path of the sail line 109 and to tow the marine seismic streamers 112 and/or source 115, depending on the particular embodiment. The global controller 403 also, in this particular embodiment, receives positioning data ("POSITION") from the marine seismic streamers 112 and issues steering commands ("STEERING") to the steering devices thereon.

The positioning and steering functionalities described herein relative to the presently disclosed technique are, in the illustrated embodiment, implemented in a pair of modified software packages called TRINAV™ and REPEAT™. In particular, they are modified to perform the technique disclosed herein. They are proprietary to WesternGeco L.L.C., the assignee hereof.

However, similar software is commercially available from a variety of sources. Concept Systems Ltd. markets a suite of software tools suitable for modification. Additional information may be obtained over the World Wide Web from the company's website. Concept Systems can also be contacted directly at 1 Logie Mill, Beaverbank Business Park, Logie Green Road, Edinburgh, EH7 4HG, Scotland, United Kingdom—(ph) +44 131 557 5595, fax +44 131 557 2367. Quest Geo Solutions Ltd. also offers suitable software tools that also may be suitable for modification. Additional information may be found on the World Wide Web or directly Passfield Business Centre, Lynchborough Road, Passfield, Liphook, Hampshire, GU30 7SB, United Kingdom; or at (ph, UK) +44 (0) 1428 751565, (ph, US) +1 281 660 5480, or (fax) +44 (0) 1428 751566. This list is not exhaustive, however. Those of ordinary skill in the art having the benefit of this disclosure will be able modify these and other commercially available software to implement the presently disclosed technique.

Returning to FIG. 11A-FIG. 11B, the application 1165 will either implement or invoke a controller 1175. The control technique employed by the global controller 403 will be implementation specific. A variety of suitable control techniques are disclosed in U.S. application Ser. No. 12/121,324, filed May 15, 2008, and in U.S. application Ser. No. 11/335,365, filed Jan. 19, 2006. Both of these applications are incorporated by reference below for their teachings with regards to the coil shooting techniques disclosed therein, including the control of the shape and position of the spread. To further an understanding of the presently disclosed technique, portions of one of these application will now be excerpted.

Some embodiments may incorporate one of the so-called "Advance Spread Control", or "Dynamic Spread Control", systems and methods described in assignee's co-pending U.S. application Ser. No. 11/122,646, filed Mar. 5, 2005. In these systems, the marine seismic spread 101 includes a vessel-mounted acoustic Doppler current meter (not shown) to measure at least a horizontal component of a current velocity vector at least at one location generally ahead of the seismic spread elements. Vessel-mounted acoustic Doppler current meters are known to the art and any suitable one may be used. The measured horizontal component is then used to control position of a seismic spread element. One suitable technique is disclosed in U.S. application Ser. No. 11/122,646, filed Mar. 5, 2005, which is incorporated below.

One particular embodiment implements these aspects of the disclosed technique with proportional-integral-derivative ("PID") controllers. PID controllers useful in the systems and methods of the invention may vary in their details. One PID controller useful in the invention may be expressed mathematically as:

$$u(t)=K_p[e(t)+1/T_i\cdot\int e(t)dt+T_d\cdot\dot{e}(t)]\text{tm (1)}$$

wherein:
∫=integrate;
$\dot{e}(t)$=the time derivative;
u(t)=controller output, either meters across to a tracking control device such as that known under the trade designation Robtrack/STS500, or heading to an autopilot;
e(t)=difference between wanted (planned, reference) and measured (current position, y) value;
$T_d$=a constant for describing the derivative part of the algorithm (the derivative part may be filtered to avoid deriving high frequencies);
$T_i$=a constant for describing the integrating part of the algorithm; and
$K_p$=a proportional gain constant.

In the s-plane (Laplace), the PID controller may be expressed as:

$$H_r(s)=K_p[1+1/T_i s+T_d s/(1+T_f s)] \quad (2)$$

wherein:
s=the variable in the s-plane; and
$T_f$=a constant describing the filtering part of the derivative part of the algorithm.

For discretization, a variety of transforms may be employed, and some constants may or may not be useful. For example, the $T_f$ constant may not be necessary in some instances, but may be especially useful in other scenarios. As one discretization example, the z-transform may be used, meaning that the integral part of the algorithm may be approximated by using a trapezoid model of the form:

$$s=(1-z_{-1})/T \quad (3)$$

while the derivative part may be approximated using an Euler model:

$$s=2/T\cdot(1-z_{-1})/(1+z_{-1}) \quad (4)$$

wherein T is the sampling time. The resulting discrete model may then be used directly in the steering algorithm. Other discrete models, derived using other transforms, are useful in the invention, and will be apparent to control technicians or control engineers of ordinary skill.

Model Predictive Control ("MPC") is an advanced multivariable control method for use in multiple input/multiple output ("MIMO") systems. An overview of industrial Model Predictive Control can be found on the World Wide Web. MPC computes a sequence of manipulated variable adjustments in order to optimize the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2. . . MPC may use any derived objective function, such as Quadratic Performance Objective, and the like, including weighting functions of manipulated variables and measurements.

Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like.

It may be difficult to explicitly state stability of an MPC control scheme, and in certain embodiments of the present invention it may be necessary to use nonlinear MPC. In so-called advance spread control of marine seismic spreads, PID control may be used on strong mono-variable loops with few or non-problematic interactions, while one or more networks of MPC might be used, or other multivariable control structures, for strong interconnected loops. Furthermore, computing time considerations may be a limiting factor. Some embodiments may employ nonlinear MPC.

Feed forward algorithms, if used, will in the most general sense be task specific, meaning that they will be specially designed to the task they are designed to solve. This specific design might be difficult to design, but a lot is gained by using a more general algorithm, such as a first or second order filter with a given gain and time constants.

The introduction of a tracking point may serve at least two purposes. First, it gives a more flexible solution for a track that we want parts of the spread to follow. Second, if other means are used for controlling source positions, like a winch or a source deflector, the vessel will in many occasions have "spare" steering capacity available. This may mean that by moving the tracking point aft of the sources, streamer front ends and consequentially also the receivers may be closer to where they should be, which may help the streamer steering devices in achieving their steering objectives.

In certain embodiments, a tracking point will not be a static point in the spread, as time varying currents may result in the center of source steering objective and the tracking point steering objective unable to be met at the same time. In these embodiments, the tracking point may be moved, either dynamically or non-dynamically, until both objectives can be met with a certain slack. The reverse might also be the case, i.e., having excess steering power resulting in moving the tracking point further aft. If the movement of the tracking point is above a predefined distance, a new set of parameters for both the controller and the feed forward controller may be used to optimize the controller performance.

Note that these are exemplary control techniques only and that they are not exhaustive. Alternative control techniques may be employed in alternative embodiments. The invention is not limited by the type of control technique employed.

Referring to both FIG. 3 and FIG. 11B, the computing apparatus 300 receives the seismic data (hydrophone as well as particle motion sensor data), and records it. The seismic survey data is recorded in, for example, the data structure 1125 in the storage 1110. From the navigation component, the computing apparatus 300 obtains estimates of system wide parameters, such as the towing direction, towing velocity, and current direction and measured current velocity.

In the illustrated embodiment, the computing apparatus 300 also monitors the actual positions of each of the birds 312, as well as other elements of the streamers 112. The computing apparatus 300 is programmed with the desired positions of or the desired minimum separations between the streamers 112 as well as other characteristics of the survey. The horizontal positions of the birds 312 can be derived using various techniques well known to the art. The vertical positions, or depths, of the birds 312 are typically monitored using pressure sensors (not shown) attached to the birds 312.

The shape of the streamer 112, and therefore the positions of its elements, during the survey may be determined using any of a variety of techniques known to the art. For instance, satellite-based global positioning system equipment can be used to determine the positions of the equipment. The Global Positioning System ("GPS"), or differential GPS, are useful, with GPS receivers (not shown) at the front and tail of the streamer. In addition to GPS based positioning, it is known to monitor the relative positions of streamers and sections of streamers through an acoustic positioning system comprised of a network of sonic transceivers 318 (only one indicated) that transmit and receive acoustic or sonar signals.

The computing apparatus 300, through execution of the global controller 403, shown in FIG. 11A-FIG. 11B, then implements the method discussed above relative to FIG. 7-FIG. 9 to determine the deviation of the elements of the seismic spread 101 from the preplot. Once the deviation is determined, the global controller 430 then issues steering commands action to correct the position of the element deviating from the planned position.

As was mentioned above, the present invention admits variation in the implementation of the sail lines 109 and those described above are exemplary only. The present invention may be used in connection with any of a number of coil shooting techniques known to the art. Several such techniques are disclosed in U.S. application Ser. No. 12/121,324, filed May 15, 2008, and in U.S. application Ser. No. 11/335,365, filed Jan. 19, 2006.

As disclosed in those applications, a "generally curved advancing path" is one in which the vessels and streamers travel generally in a curve, and there is an advancement in one or more of the x- and y-directions. The path may be expressed as a coil. The curve may be circular, ovoid (including one or more ovals), elliptical (including one or more ellipses), FIG. 8, sinusoidal, or some other curved path. The path may vary within the same survey; for example, a first portion of the survey may follow an ovoid path, a second portion of the survey may follow an elliptical path, as one of many examples.

Note that the present technique includes methods wherein the survey vessels—and, hence, the seismic spread—travel clockwise or counterclockwise. Generally, there is no intrinsic advantage of one direction over the other. However, in embodiments where a single survey vessel travels along a sincurve both clockwise and counterclockwise there may be an advantage in the presence of localized strong currents. The clockwise versus counter-clockwise directions may be selected at the beginning of each new swath as a function of the currents. It is generally not practical to change direction from circle to circle (for example clockwise then counter-clockwise) due to loss of time.

Also as mentioned above, the invention admits variation in the implementation of the seismic survey spread by which the coil shooting is implemented. Several variations in the composition and configuration of the spread used for coil shooting are disclosed in U.S. application Ser. No. 12/121,324, filed May 15, 2008, and in U.S. application Ser. No. 11/335,365, filed Jan. 19, 2006. Any of these variations may be employed in alternative embodiments of the presently disclosed techniques.

Some embodiments employ Q™ and Q-MARINE™ technologies. As used herein, "Q™" is the WesternGeco proprietary suite of advanced seismic technologies for enhanced reservoir location, description, and management. "Q-MARINE™" systems, as discussed herein, refer to the marine seismic spreads employed by WesternGeco and having an accurate positioning system; streamer steering; and advance noise attenuation capabilities. For additional information on Q-Marine™, a fully calibrated, point-receiver marine seismic acquisition and processing system, as well as Q-Land™ and Q-Seabed™.

In these systems, streamers may be equipped with acoustic transmitters and point receivers for accurate position determination, employing intrinsic ranging modulated acoustics, as taught in U.S. Pat. No. 5,668,775 ("the '775 patent"). As taught in the '775 patent, the streamer transmitters and point receivers may form a full-streamer-length acoustic network, wherein a unique spread spectrum code of acoustic frequencies are emitted by each of a plurality of acoustic transmitters placed within the streamers, all frequencies being within the seismic frequencies detected by the same receivers during shooting and recording, and the point receivers within the streamers are able to distinguish each transmitter's unique code. Thus, accurate positioning of seismic receivers is possible. Conventional streamers use arrays of hydrophones, such as 12 or 18 hydrophones per group, which are summed together in analog fashion and than recorded.

Furthermore, the single sensors or point receivers are placed in the streamer at intervals, for example one every 3 m to 4 m, and recorded. All point receivers route data to a computer, where digital filters are applied taking advantage of the very fine sampling of the receivers for very powerful coherent noise attenuation of line swell noise and/or streamer cable noise. During the turns the noise from marine current may be stronger, since at least portions of the streamers may be traveling cross-current. Noise can therefore be attenuated from each point receiver very well. Streamers may also be steered into desired positions by steering devices, as further described herein.

As is apparent from the discussion above, some aspects of the present invention are implemented in software executed by a computing apparatus. Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The following documents are incorporated by reference herein for all purposes as if set forth herein verbatim:

U.S. Application Ser. No. 61/061,357, filed Jun. 13, 2008, in the name of the inventors Stig Solheim and Kjell Saeten, and entitled, "Filtering and presentation of heading observations for coil shooting".

U.S. Application Ser. No. 61/061,330, filed Jun. 13, 2008, in the name of the inventors Johan Hauan et al., and entitled, "Method to Determine the Deviation of Seismic Equipment from a Planned Curved Path".

U.S. application Ser. No. 11/335,365, filed Jan. 19, 2006, in the name of the inventors Nicolae Moldoveanu and Alan Strudley, and entitled, "Methods and Systems for Efficiently Acquiring Towed Streamer Seismic Surveys".

U.S. application Ser. No. 12/121,324, filed May 15, 2008, in the name of the inventors Nicolae Moldoveanu and Steven Fealy, and entitled, "Methods for Efficiently Acquiring Wide-Azimuth Towed Streamer Seismic Data".

U.S. Provisional Application Ser. No. 60/938,547 filed May 17, 2007, entitled, "Methods for Efficiently Acquiring Wide-Azimuth Towed Streamer Seismic Data", and filed in the name of the inventors Nicolae Moldoveanu and Steven Fealy.

U.S. Provisional Application Ser. No. 60/966,534 (converted from U.S. application Ser. No. 11/836,675, filed Aug. 9, 2007, by petition filed Aug. 31, 2007), entitled, "Methods for Efficiently Acquiring Wide-Azimuth Towed Streamer Seismic Data", and filed in the name of the inventors Nicolae Moldoveanu and Steven Fealy.

U.S. Provisional Application Ser. No. 60/969,203 filed Aug. 31, 2007, entitled, "Methods for Efficiently Acquiring Wide-Azimuth Towed Streamer Seismic Data", and filed in the name of the inventors Nicolae Moldoveanu and Steven Fealy.

U.S. application Ser. No. 11/836,675, filed Aug. 9, 2007, entitled, "Methods for Efficiently Acquiring Wide-Azimuth Towed Streamer Seismic Data", and filed in the name of the inventors Nicolae Moldoveanu and Steven Fealy, which was converted to U.S. Provisional Application Ser. No. 60/966,534 by petition filed Aug. 31, 2007;

U.S. application Ser. No. 11/114,773, filed Apr. 26, 2005, entitled, "Seismic Streamer System and Method", and filed in the name of the inventors Rohitashva Singh, et al., published Oct. 26, 2006, as Patent Publication 20060239117 A1;

U.S. application Ser. No. 11/122,646, filed Mar. 5, 2005, entitled, "Forward looking systems and methods for positioning marine seismic equipment", and filed in the name of the inventors Rune Toennessen, et al., published Nov. 16, 2006, as Patent Publication 20060256653 A1;

U.S. Pat. No. 5,668,775, entitled "Methods for determining the position of seismic equipment, and applications of the methods", and issued Sep. 16, 1997, to GECO A. S. in the name of the inventor Kjell Hatteland;

PCT International Application WO 00/20895, entitled "Control System for Positioning of Marine Seismic Streamers", filed under the Patent Cooperation Treaty on Sep. 28, 1999, in the name of Services Petroliers Schlumberger as assignee of the inventors Oyvind Hillesund et al.;

PCT International Application WO 98/28636, entitled "Control Devices for Controlling the Position of a Marine Seismic Streamer", filed under the Patent Cooperation Treaty on filed Dec. 19, 1997, in the name of Geco A S as assignee of the inventor Simon Bittleston;

U.S. Pat. No. 7,377,224, entitled "Apparatus and Methods for Seismic Streamer Positioning", and issued May 27, 2008, to Western Geco, L.L.C. in the name of the inventors Sarah E. Ryan and Rohitashiva Singh;

U.S. Pat. No. 7,403,448, entitled "Streamer Steering Device Orientation Determination Apparatus and Methods", and issued Jul. 22, 2008, to Western Geco, L.L.C. in the name of the inventors Kenneth E. Welker, et al.;

U.S. Pat. No. 7,293,520, entitled "Control system for positioning of a marine seismic streamers", and issued Nov. 13, 2007, to WesternGeco, L.L.C. in the name of the inventors Oyvind Hillesund and Simon H. Bittleston;

U.S. Pat. No. 6,671,223, entitled "Control devices for controlling the position of a marine seismic streamer", and issued Dec. 30, 2003, to WesternGeco, L.L.C. in the name of the inventor Simon H. Bittleston;

U.S. Pat. No. 3,774,570, entitled "Non-Rotating Depth Controller Paravane for Seismic Cables", and issued Nov. 27, 1973, to Whitehall Electronics in the name of the inventors Raymond H. Pearson;

U.S. Pat. No. 3,560,912, entitled "Control System for a Towed Vehicle", and issued Feb. 2, 1971, to Westinghouse Electric Corporation in the name of the inventors P. G. Spink, et al.;

U.S. Pat. No. 5,443,027, entitled "Lateral force device for underwater towed array", and issued Aug. 22, 1995, to The United States of America as represented by the Secretary of the Navy in the name of the inventor Norman L. Owsley;

U.S. Pat. No. 3,605,674, entitled "Underwater Cable Controller", and issued Sep. 20, 1971, to Dresser Industries, Inc. in the name of the inventor Raymond C. Weese;

U.S. Pat. No. 4,404,664, entitled "System for laterally positioning a towed marine cable and method of using same", and issued Sep. 13, 1983, to Mobil Oil Corporation in the name of the inventor Robert G. Zachariadis;

U.S. Pat. No. 6,525,992, entitled "Devices for controlling the position of an underwater cable", and issued Feb. 25, 2003, to Input/Output, Inc. in the name of the inventors Andrew W. Olivier, et al.;

U.S. Pat. No. 7,203,130, entitled "Methods for deriving shape of seismic data acquisition cables and streamers employing a force model", and issued Apr. 10, 2007, to WesternGeco, L.L.C. in the name of the inventor Kenneth E. Welker; and EP Patent Publication No. EP 0613025, entitled "A Device and Method for Positioning of Towing Systems for Use in Marine Seismic Systems", and filed Feb. 22, 1994, in the name of the inventor Tor Elholm.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A computer-implemented method, comprising:
monitoring a plurality of actual positions of a plurality of steerable positioning elements in a towed-array of a marine seismic survey spread while the marine seismic survey spread sails along a generally advancing curved sail line, wherein the sail line has a radius that is a function of a width of the marine seismic survey spread and the sail line is a function of a roll in a y-direction ("DY") and a roll in an x-direction ("DX");
determining respective desired positions of the steerable positioning elements;
determining a plurality of steering residuals between the actual positions and the respective desired positions of the steerable positioning elements;
issuing steering commands to the steerable positioning elements as indicated by the determined steering residuals to steer the steerable positioning elements to the respective desired positions; and
acquiring full azimuth seismic data using the marine seismic survey spread.

2. The computer-implemented method of claim 1, wherein monitoring the actual positions of the steerable positioning elements includes using both global navigation satellite system signals and acoustic positioning signals.

3. The computer-implemented method of claim 1, wherein monitoring the actual positions of the steerable positioning elements includes combining a force model with previously known three-dimensional coordinates and at least one of acoustically measured distances, magnetic north referenced directions, and global navigation satellite systems surface control.

4. The computer-implemented method of claim 1, wherein determining the respective desired positions of the steerable positioning elements includes:
referencing a preplot curve; and
determining a respective desired position of a respective steerable positioning element from the preplot curve and the place of the respective steerable positioning element in the towed array.

5. The computer-implemented method of claim 1, wherein determining the respective desired positions of the steerable positioning elements includes:
referencing a navigation plan; and
determining a respective desired position of a respective steerable positioning element from the navigation plan and the place of the respective steerable positioning element in the towed array.

6. The computer-implemented method of claim 1, wherein determining the steering residuals includes:
subtracting one of a respective nominal position and an actual position from the other; and
rotating the difference into a respective inline component and a respective crossline component.

7. The computer-implemented method of claim 1, further comprising performing error analysis on the determined steering residuals.

8. The computer-implemented method of claim 1, further comprising performing statistical analyses for use in evaluating whether survey specifications are being met.

9. A computer-readable program storage medium encoded with instructions that, when executed by a processor, performs a method comprising:
monitoring a plurality of actual positions of a plurality of steerable positioning elements in a towed-array of a marine seismic survey spread while the marine seismic survey spread sails along a generally advancing curved sail line, wherein the sail line has a radius that is a function of a width of the marine seismic survey spread;
determining respective desired positions of the steerable positioning elements for the actual positions;
determining a plurality of steering residuals between the actual positions and the respective desired positions of the steerable positioning elements; and
issuing steering commands to the steerable positioning elements as indicated by the determined steering residuals to steer the steerable positioning elements to the respective desired positions.

10. The computer-readable program storage medium of claim 9, wherein monitoring the actual positions of the steerable positioning elements includes using both global navigation satellite system signals and acoustic positioning signals.

11. The computer-readable program storage medium of claim 9, wherein monitoring the actual positions of the steerable positioning elements includes combining a force model with previously known three-dimensional coordinates and at least one of acoustically measured distances, magnetic north referenced directions, and global navigation satellite systems surface control.

12. The computer-readable program storage medium of claim 9, wherein determining the respective desired positions of the steerable positioning elements includes:
   referencing a preplot curve; and
   determining a respective desired position of a respective steerable positioning element from the preplot curve and the place of the respective steerable positioning element in the towed array.

13. The computer-readable program storage medium of claim 9, wherein determining the respective desired positions of the steerable positioning elements includes:
   referencing a navigation plan; and
   determining a respective desired position of a respective steerable positioning element from the navigation plan and the place of the respective steerable positioning element in the towed array.

14. The computer-readable program storage medium of claim 9, wherein determining the steering residuals includes:
   subtracting one of a respective nominal position and an actual position from the other; and
   rotating the difference into a respective inline component and a respective crossline component.

15. A computing apparatus, comprising:
   a processor;
   a bus system;
   a storage communicating with the processor over the bus system; and
   a software component residing on the storage that, when invoked by the processor over the bus system, performs a method comprising:
      monitoring a plurality of actual positions of a plurality of steerable positioning elements in a towed-array of a marine seismic survey spread while the marine seismic survey spread sails along a generally advancing curved sail line, wherein the sail line has a radius that is a function of a width of the marine seismic survey spread;
      determining respective desired positions of the steerable positioning elements for the actual positions;
      determining a plurality of steering residuals between the actual positions and the respective desired positions of the steerable positioning elements; and
      issuing steering commands to the steerable positioning elements as indicated by the determined steering residuals to steer the steerable positioning elements to the respective desired positions.

16. The computing apparatus of claim 15, wherein monitoring the actual positions of the steerable positioning elements includes using both global navigation satellite system signals and acoustic positioning signals.

17. The computing apparatus of claim 15, wherein monitoring the actual positions of the steerable positioning elements includes combining a force model with previously known three-dimensional coordinates and at least one of acoustically measured distances, magnetic north referenced directions, and global navigation satellite system surface control.

18. The computing apparatus of claim 15, wherein determining the respective desired positions of the steerable positioning elements includes:
   referencing a preplot curve; and
   determining a respective desired position of a respective steerable positioning element from the preplot curve and the place of the respective steerable positioning element in the towed array.

19. The computing apparatus of claim 15, wherein determining the respective desired positions of the steerable positioning elements includes:
   referencing a navigation plan; and
   determining a respective desired position of a respective steerable positioning element from the navigation plan and place of the respective steerable positioning element in the towed array.

20. The computing apparatus of claim 15, wherein determining the steering residuals includes:
   subtracting one of a respective nominal position and an actual position from the other; and
   rotating the difference into a respective inline component and a respective crossline component.

21. A method for use in a towed-array marine seismic survey, comprising:
   towing an array on a generally advanced curving path;
   controlling the shape and position of the array during the acquisition, including:
      monitoring a plurality of actual positions of a plurality of steerable positioning elements in a towed-array of a marine seismic survey spread while the marine seismic survey spread sails along a generally advancing curved sail line, wherein the sail line has a radius that is a function of a width of the marine seismic survey spread and the sail line is a function of a roll in a y-direction ("DY") and a roll in an x-direction ("DX");
      determining respective desired positions of the steerable positioning elements for the actual positions;
      determining a plurality of steering residuals between the actual positions and the respective desired positions of the steerable positioning elements; and
      steering the steerable positioning elements as indicated by the determined steering residuals to the respective desired positions; and
   acquiring full azimuth seismic data while towing the array.

22. The method of claim 21, wherein monitoring the actual positions of the steerable positioning elements includes using both global navigation satellite system and signals acoustic positioning signals.

23. The method of claim 21, wherein monitoring the actual positions of the steerable positioning elements includes combining a force model with previously known three-dimensional coordinates and at least one of acoustically measured distances, magnetic north referenced directions, and global navigation satellite systems surface control.

24. The method of claim 21, wherein determining the respective desired positions of the steerable positioning elements includes:
   referencing a preplot curve; and
   determining a respective desired position of a respective steerable positioning element from the preplot curve and the place of the respective steerable positioning element in the towed array.

25. The method of claim 21, wherein determining the respective desired positions of the steerable positioning elements includes:
   referencing a navigation plan; and
   determining a respective desired position of a respective steerable positioning element from the navigation plan and the place of the respective steerable positioning element in the towed array.

26. The method of claim 21, wherein determining the steering residuals includes:
 subtracting one of a respective nominal position and an actual position from the other; and
 rotating the difference into a respective inline component and a respective crossline component.

27. A method for use in a towed-array marine seismic survey, comprising:
 comparing a plurality of actual shapes of a plurality of streamers in the survey based on coordinate estimates of a plurality of selected points along the streamers to a predetermined planned shape to give a desired geophysical outcome assuming a plurality of sources and receivers are in a plurality of planned positions while towed along a generally advancing curved sail line, wherein the sail line has a radius that is a function of a width of the marine seismic survey spread; and
 determining steering commands based on a difference between a plurality of actual coordinates of the selected points and a plurality of desired coordinates of the selected points.

28. The method of claim 27, wherein comparing the actual shapes to the predetermined planned shape includes:
 monitoring a plurality of actual positions of a plurality of steerable positioning elements in a towed-array of a marine seismic survey spread while the marine seismic survey spread sails along a generally advancing curved path;
 determining respective desired positions of the steerable positioning elements for the actual positions; and
 determining a plurality of steering residuals between the actual positions and the respective desired positions of the steerable positioning elements.

29. The method of claim 27, wherein the steering commands include changing wing angle of a steering device to obtain a plurality of angles of attack that give the steering devices lift or side force that changes the shape of the streamer to match a planned streamer shape.

30. The method of claim 27, wherein the steering commands include a desired side force based on an assumed angle of attack.

* * * * *